US012602680B2

(12) United States Patent
Mu et al.

(10) Patent No.: US 12,602,680 B2
(45) Date of Patent: Apr. 14, 2026

(54) DIGITAL CURRENCY WALLET MANAGEMENT METHOD, APPARATUS, AND SYSTEM, REMOTE CONTROL METHOD, APPARATUS AND SYSTEM FOR DIGITAL CURRENCY WALLET

(71) Applicant: DIGITAL CURRENCY INSTITUTE, THE PEOPLE'S BANK OF CHINA, Beijing (CN)

(72) Inventors: Changchun Mu, Beijing (CN); Gang Di, Beijing (CN); Xinyu Zhao, Beijing (CN); Jianchang Guo, Beijing (CN); Peidong Cui, Beijing (CN); Peng Yu, Beijing (CN); Zhan Shi, Beijing (CN)

(73) Assignee: DIGITAL CURRENCY INSTITUTE, THE PEOPLE'S BANK OF CHINA, Beijing (CN)

(*) Notice: Subject to any disclaimer, the term of this patent is extended or adjusted under 35 U.S.C. 154(b) by 216 days.

(21) Appl. No.: 18/703,354

(22) PCT Filed: Oct. 17, 2022

(86) PCT No.: PCT/CN2022/125748
§ 371 (c)(1),
(2) Date: Apr. 21, 2024

(87) PCT Pub. No.: WO2023/066215
PCT Pub. Date: Apr. 27, 2023

(65) Prior Publication Data
US 2025/0238785 A1     Jul. 24, 2025

(30) Foreign Application Priority Data

Oct. 22, 2021    (CN) .......................... 202111234552.5
Oct. 28, 2021    (CN) .......................... 202111264208.0

(51) Int. Cl.
*G08B 21/00*     (2006.01)
*G06Q 20/36*     (2012.01)

(52) U.S. Cl.
CPC ......... *G06Q 20/36* (2013.01); *G06Q 2220/00* (2013.01)

(58) Field of Classification Search
CPC .. G06Q 20/36; G06Q 2220/00; G06Q 20/223; G06Q 20/3676; G06Q 20/4016;
(Continued)

(56) References Cited

U.S. PATENT DOCUMENTS

| | | | |
|---|---|---|---|
| 6,300,899 | B1 | 10/2001 | King |
| 2007/0187491 | A1 | 8/2007 | Godwin |

(Continued)

FOREIGN PATENT DOCUMENTS

| | | |
|---|---|---|
| CN | 101093566 A | 12/2007 |
| CN | 104217323 A | 12/2014 |

(Continued)

OTHER PUBLICATIONS

The Supplementary Search Report of counterpart CN application No. 202111234552.5 issued on Aug. 29, 2025.
(Continued)

*Primary Examiner* — Mark S Rushing
(74) *Attorney, Agent, or Firm* — The Sun IP Law

(57) ABSTRACT

The provided are a digital currency wallet management method, apparatus, and system, remote control method, apparatus and system for a digital currency wallet which relate to the field of computer technologies. A method includes: detecting a connection state with a digital currency platform; obtaining a current moment by means of a communication satellite in a case that the connection state with the digital currency platform indicates an offline state; calculating an offline duration according to the current (Continued)

moment and a self-saved last synchronization moment; determining whether the offline duration is greater than a preset offline duration; and in a case that it is determined that the offline duration is greater than the preset offline duration, generating a wallet key information set, and sending the wallet key information set to the digital currency platform, so that the digital currency platform synchronizes and processes the wallet key information set.

20 Claims, 7 Drawing Sheets

(58) Field of Classification Search
CPC .. G06Q 20/065; G06Q 20/30; G06Q 20/3829; G06Q 20/386; H04L 2209/56; H04L 9/3249; H04L 9/50
USPC ...................................................... 340/568.7
See application file for complete search history.

(56) References Cited

U.S. PATENT DOCUMENTS

| | | | | |
|---|---|---|---|---|
| 2009/0096604 | A1 | 4/2009 | Battista | |
| 2016/0335628 | A1 * | 11/2016 | Weigold | G06Q 20/065 |
| 2017/0053268 | A1 * | 2/2017 | Pande | G06Q 20/40145 |
| 2017/0193513 | A1 | 7/2017 | Zand-Biglari | |
| 2017/0300904 | A1 | 10/2017 | Chung | |
| 2020/0013052 | A1 * | 1/2020 | Fok | H04L 9/3239 |
| 2020/0410482 | A1 * | 12/2020 | Mayblum | H04L 9/50 |
| 2021/0049591 | A1 | 2/2021 | Lamesh | |
| 2021/0097521 | A1 | 4/2021 | Kumar | |
| 2021/0110369 | A1 * | 4/2021 | Hamasako | G06Q 20/40155 |

FOREIGN PATENT DOCUMENTS

| | | | |
|---|---|---|---|
| CN | 104618940 | A | 5/2015 |
| CN | 107230069 | A | 10/2017 |
| CN | 107608832 | A | 1/2018 |
| CN | 108229942 | A | 6/2018 |
| CN | 109613818 | A | 4/2019 |
| CN | 109670799 | A | 4/2019 |
| CN | 111489148 | A | 8/2020 |
| CN | 112330946 | A | 2/2021 |
| CN | 112837065 | A | 5/2021 |
| CN | 112950193 | A | 6/2021 |
| CN | 113176591 | A | 7/2021 |
| CN | 113191869 | A | 7/2021 |
| CN | 113298526 | A | 8/2021 |
| CN | 114186990 | A | 3/2022 |
| CN | 114202332 | A | 3/2022 |
| EP | 1128339 | A2 | 8/2001 |
| JP | 2018189469 | A | 11/2018 |
| JP | 2020204883 | A | 12/2020 |
| JP | 2021022385 | A | 2/2021 |
| KR | 20120041420 | A | 5/2012 |
| WO | 2013083960 | A1 | 6/2013 |

OTHER PUBLICATIONS

The second search report of counterpart EP application No. 22882821.6 issued on Apr. 16, 2025.
The first office action of counterpart CN application No. 202111234552.5 issued on Jan. 15, 2025.
The first office action of counterpart CN application No. 202111264208.0 issued on Jan. 10, 2025.
Santamarta Ruben,A Wake-up Call for 1-20SATCOM Security, Jan. 1, 2014.
Paisley Kinley,Credit Card Processing 1-20Over Satellite: Equipment, Airtime, AndCost,Sep. 25, 2013.
Huang Linqi, "Commercial development strategy of Beidou satellite navigation system," National Defense Science & Technology, vol. 38, No. 01, Feb. 28, 2017.
The first Office Action of the priority CN patent application No. 202111264208.0 issued on Jan. 10, 2025.
The first office action of counterpart EP application No. 22882821.6 issued on Jan. 7, 2025.

* cited by examiner

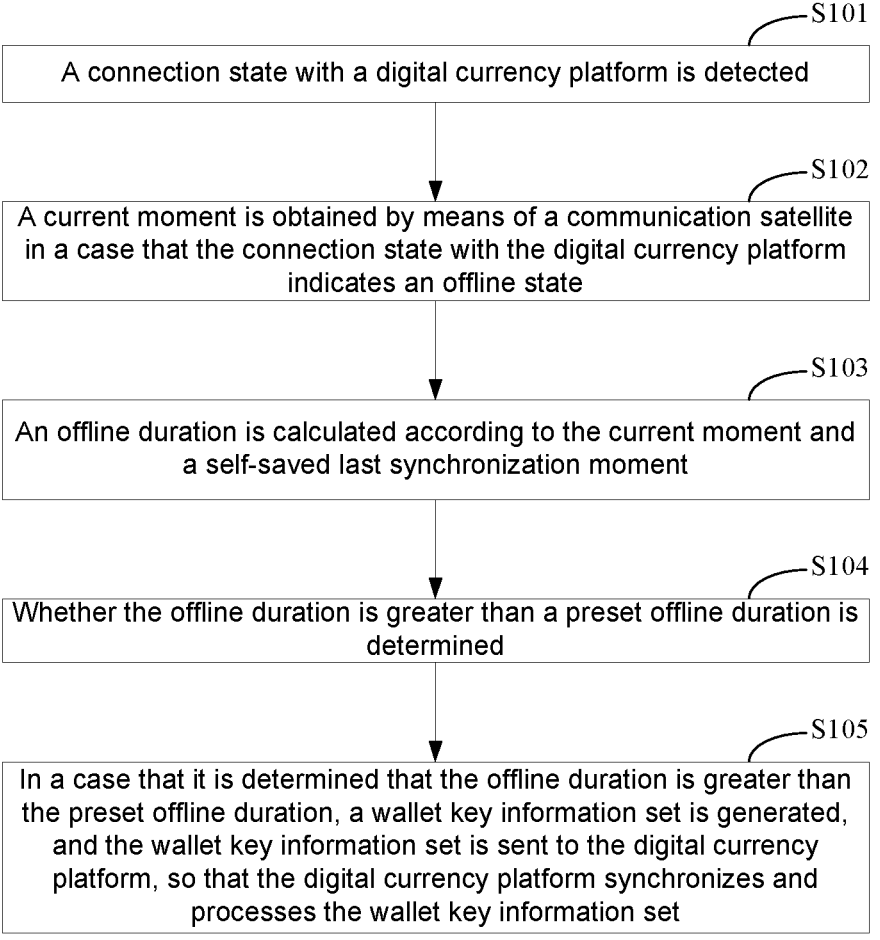

S101

A connection state with a digital currency platform is detected

S102

A current moment is obtained by means of a communication satellite in a case that the connection state with the digital currency platform indicates an offline state

S103

An offline duration is calculated according to the current moment and a self-saved last synchronization moment

S104

Whether the offline duration is greater than a preset offline duration is determined

S105

In a case that it is determined that the offline duration is greater than the preset offline duration, a wallet key information set is generated, and the wallet key information set is sent to the digital currency platform, so that the digital currency platform synchronizes and processes the wallet key information set

Fig. 1

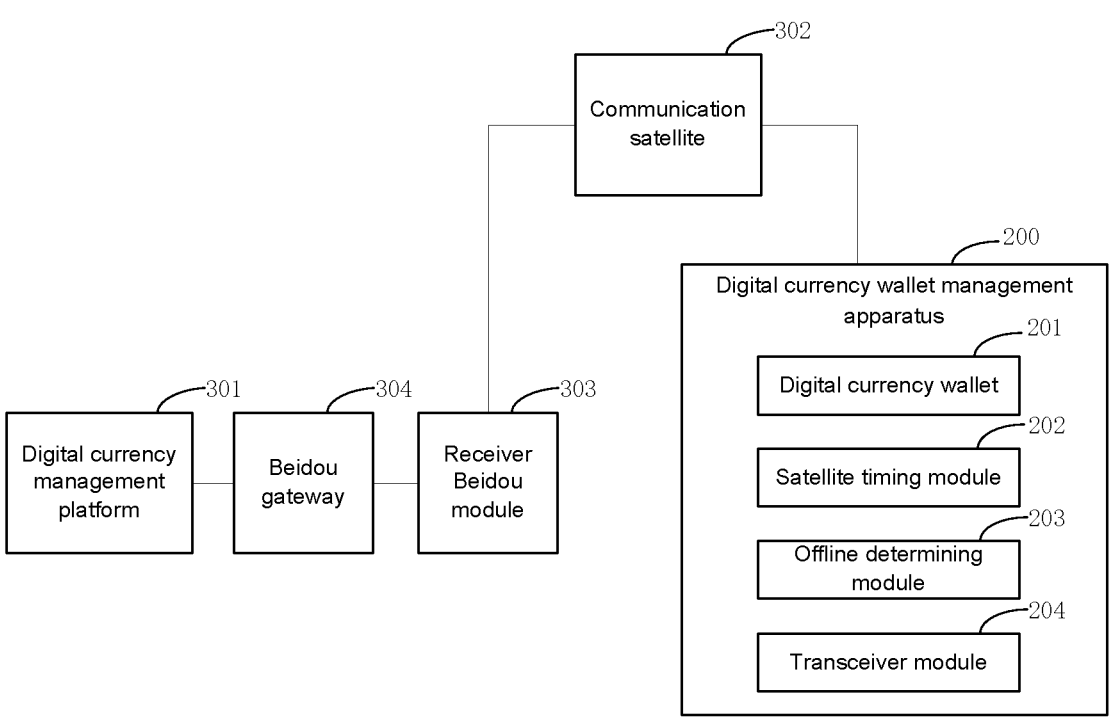

Fig. 4

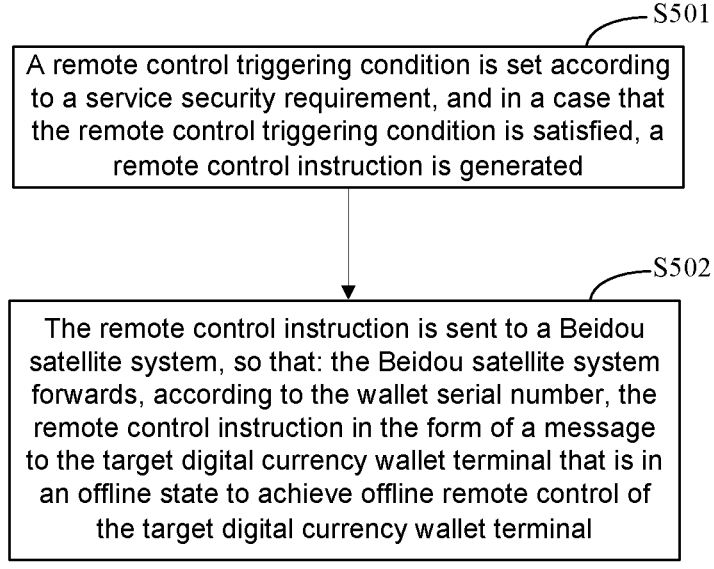

S501

A remote control triggering condition is set according to a service security requirement, and in a case that the remote control triggering condition is satisfied, a remote control instruction is generated

S502

The remote control instruction is sent to a Beidou satellite system, so that: the Beidou satellite system forwards, according to the wallet serial number, the remote control instruction in the form of a message to the target digital currency wallet terminal that is in an offline state to achieve offline remote control of the target digital currency wallet terminal

Fig. 5

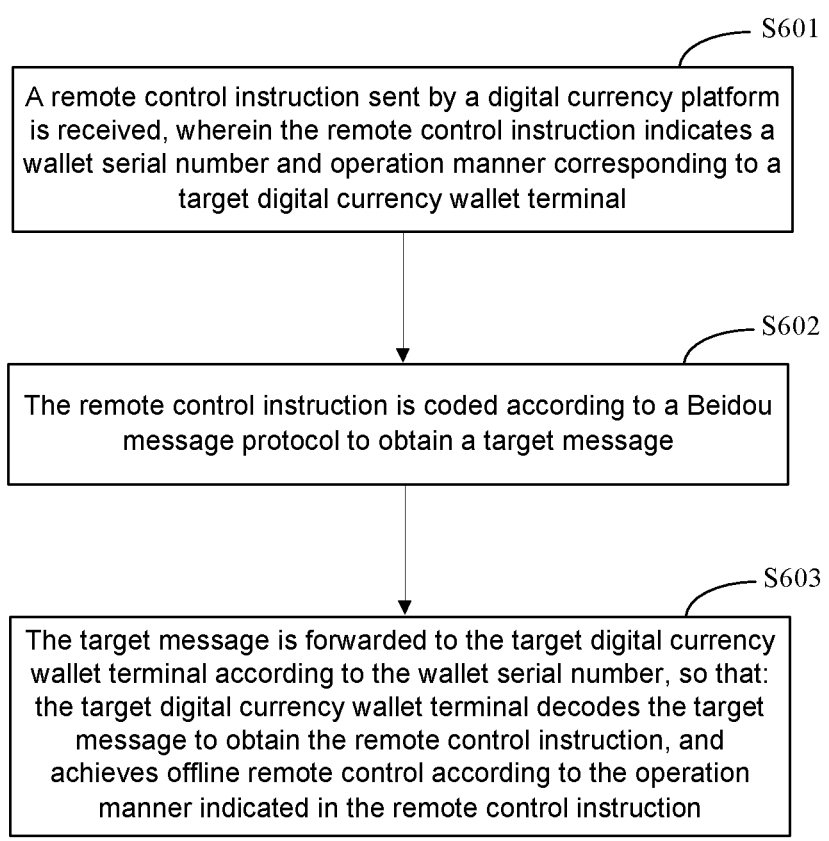

S601

A remote control instruction sent by a digital currency platform is received, wherein the remote control instruction indicates a wallet serial number and operation manner corresponding to a target digital currency wallet terminal

S602

The remote control instruction is coded according to a Beidou message protocol to obtain a target message

S603

The target message is forwarded to the target digital currency wallet terminal according to the wallet serial number, so that: the target digital currency wallet terminal decodes the target message to obtain the remote control instruction, and achieves offline remote control according to the operation manner indicated in the remote control instruction

Fig. 6

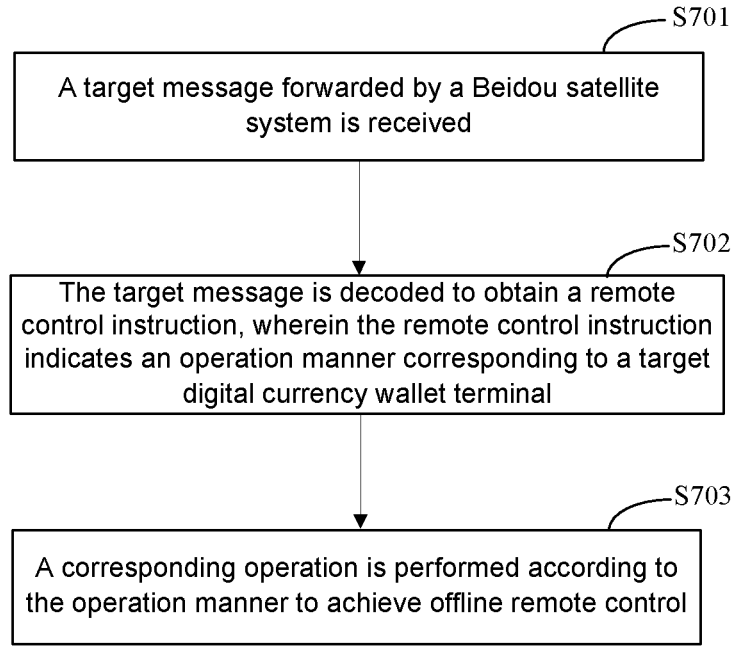

S701

A target message forwarded by a Beidou satellite system is received

S702

The target message is decoded to obtain a remote control instruction, wherein the remote control instruction indicates an operation manner corresponding to a target digital currency wallet terminal

S703

A corresponding operation is performed according to the operation manner to achieve offline remote control

DIGITAL CURRENCY WALLET MANAGEMENT METHOD, APPARATUS, AND SYSTEM, REMOTE CONTROL METHOD, APPARATUS AND SYSTEM FOR DIGITAL CURRENCY WALLET

CROSS-REFERENCE TO RELATED APPLICATION

This application claims the priority of Chinese patent application No. 202111234552.5, filed on Oct. 22, 2021 and entitled "Digital Currency Wallet Management Method, Apparatus, and System", and the priority of Chinese patent application No. 202111264208.0, filed on Oct. 28, 2021 and entitled "Remote Control Method and Apparatus and system for Digital Currency Wallet", the contents of which are incorporated by reference herein in its entirety or part of this application.

TECHNICAL FIELD

The present disclosure relates to the field of computer technologies, and in particular, to a digital currency wallet management method, apparatus, and system.

BACKGROUND

A digital currency wallet implemented based on a Secure Element (SE) has high security and close range communication capability (such as Bluetooth/Near Field Communication (NFC)), which can support offline transactions. Wallet clients of two parties can complete a transaction in a close range without communicating with a platform.

On the one hand, if an offline duration of the digital currency wallet is too long, it may cause the clock of the digital currency wallet to be inaccurate, leading to distorted transaction information and affecting the service security. On the other hand, in the related technology, it is difficult to remotely control the digital currency wallet in an offline state (especially in an emergency, when a digital currency wallet terminal in an offline state is vulnerable to network attacks and fails to update a blacklist and other risk wallet number information in a timely manner), resulting in a low security factor of the digital currency wallet. Moreover, in a case of poor mobile cellular communication signals, remote control information sent to the digital currency wallet terminal is easily interfered, leading to poor remote control effect.

SUMMARY

In view of this, embodiments of the present disclosure provide a digital currency wallet management method, apparatus, and system, remote control methods, apparatuses and system for a digital currency wallet.

In order to achieve the above objectives, according to an aspect of the embodiments of the present disclosure, a digital currency wallet management method is provided.

A digital currency wallet management method according to the embodiments of the present disclosure is applied to a digital currency wallet terminal, and includes:

detecting a connection state with a digital currency platform;

obtaining a current moment by means of a communication satellite in a case that the connection state with the digital currency platform indicates an offline state;

calculating an offline duration according to the current moment and a self-saved last synchronization moment;

determining whether the offline duration is greater than a preset offline duration;

in a case that it is determined that the offline duration is greater than the preset offline duration, generating a wallet key information set, and sending the wallet key information set to the digital currency platform, so that the digital currency platform synchronizes and processes the wallet key information set.

According to one or more embodiments of the present disclosure, the obtaining a current moment by means of a communication satellite in a case that the connection state with the digital currency platform indicates an offline state includes:

sending a latest moment acquiring request to a Beidou satellite and a Global Positioning System (GPS) satellite;

receiving a first latest moment returned by the Beidou satellite and a second latest moment returned by the GPS satellite, and recording a first return duration of the Beidou satellite and a second return duration of the GPS satellite; and determining whether the first return duration is less than the second return duration, if yes, taking the first latest moment as the current moment, and if not, taking the second latest moment as the current moment.

According to one or more embodiments of the present disclosure, in a case that it is determined that the offline duration is greater than the preset offline duration, the method further includes:

locking the digital currency wallet, and executing, according to self-saved wallet key information, the step of generating a wallet key information set.

According to one or more embodiments of the present disclosure, the wallet key information includes any one or more pieces of the following information: time information, positioning information, an offline duration, digital currency information, and transaction information;

the generating a wallet key information set includes:

encrypting the wallet key information to obtain encrypted wallet key information; and signing the encrypted wallet key information to obtain a signature identifier, and taking the encrypted wallet key information and the signature identifier as the wallet key information set.

According to one or more embodiments of the present disclosure, the sending the wallet key information set to the digital currency platform includes:

uploading the wallet key information set to the Beidou satellite and/or the GPS satellite, so that the Beidou satellite and/or the GPS satellite sends the wallet key information set to the digital currency platform, and the digital currency platform synchronizes and processes the wallet key information set.

According to one or more embodiments of the present disclosure, the uploading the wallet key information set to the Beidou satellite and/or the GPS satellite includes:

writing the wallet key information set into a message to be sent;

determining whether a length of the message is greater than a length corresponding to a message communication capability of the message;

in a case that it is determined that the length of the message is greater than the length corresponding to the message communication capability of the message, splitting the message according to the message communication capability; and sending the split message to the Beidou satellite and/or the GPS satellite.

According to one or more embodiments of the present disclosure, after the sending the wallet key information set to the digital currency platform, the method further includes:

monitoring whether synchronization success information returned by the digital currency platform has been received; and in a case that the synchronization success information has not been received within a preset duration, resending the wallet key information set to the digital currency platform, and returning to execute the step of monitoring whether synchronization success information returned by the digital currency platform has been received.

According to one or more embodiments of the present disclosure, the detecting a connection state with a digital currency platform includes:

sending for at least once a connection request with the digital currency platform; and detecting a connection result of the connection request, and determining the connection state with the digital currency platform according to the connection result.

According to one or more embodiments of the present disclosure, the detecting a connection state with a digital currency platform includes:

regularly sending a heartbeat signal to the digital currency platform to detect the connection state with the digital currency platform; or, sending the connection request to the digital currency platform according to a received transaction request, so as to detect the connection state with the digital currency platform.

According to one or more embodiments of the present disclosure, the sending the connection request to the digital currency platform according to a received transaction request, so as to detect the connection state with the digital currency platform includes:

sending the connection request to the digital currency platform for at least once every time one transaction request has been received, so as to detect the connection state with the digital currency platform; or progressively increasing the number of the received transaction requests, and when the number is greater than a preset number threshold, sending the connection request to the digital currency platform for at least once, so as to detect the connection state with the digital currency platform.

In order to achieve the above objectives, according to another aspect of the embodiments of the present disclosure, a remote control method for a digital currency wallet is provided.

A remote control method for a digital currency wallet according to the embodiments of the present disclosure is applied to a digital currency platform, and includes:

setting a remote control triggering condition according to a service security requirement, and in a case that the remote control triggering condition is satisfied, generating a remote control instruction, wherein the remote control instruction indicates a wallet serial number and operation manner corresponding to a target digital currency wallet terminal; and sending the remote control instruction to a Beidou satellite system, so that: the Beidou satellite system forwards, according to the wallet serial number, the remote control instruction in the form of a message to the target digital currency wallet terminal that is in an offline state to achieve offline remote control of the target digital currency wallet terminal.

According to one or more embodiments of the present disclosure, the wallet serial number corresponding to the target digital currency wallet terminal is determined according to the remote control triggering condition that is satisfied; and the remote control triggering condition includes one or more of the following:

a risk level corresponding to the digital currency platform and/or a risk level corresponding to any digital currency wallet terminal exceeds a risk level threshold; and a risk wallet serial number list stored in any digital currency wallet terminal is inconsistent with a risk wallet serial number list stored in the digital currency platform.

According to one or more embodiments of the present disclosure, the remote control instruction includes a transaction restriction instruction, so that the target digital currency wallet terminal that has received the transaction restriction instruction stops an offline transaction.

According to one or more embodiments of the present disclosure, after the step of generating a remote control instruction, the remote control method further includes:

encrypting the remote control instruction; and signing the encrypted remote control instruction.

A remote control method for a digital currency wallet according to the embodiments of the present disclosure is applied to a Beidou satellite system, and includes:

receiving a remote control instruction sent by a digital currency platform, wherein the remote control instruction indicates a wallet serial number and operation manner corresponding to a target digital currency wallet terminal; and coding the remote control instruction according to a Beidou message protocol to obtain a target message; and forwarding the target message to the target digital currency wallet terminal according to the wallet serial number, so that: the target digital currency wallet terminal decodes the target message to obtain the remote control instruction, and achieves offline remote control according to the operation manner indicated in the remote control instruction.

According to one or more embodiments of the present disclosure, the remote control instruction further indicates a Beidou communication module serial number corresponding to the target digital currency wallet terminal; and the forwarding the target message to the target digital currency wallet terminal according to the wallet serial number includes:

forwarding the target message to the target digital currency wallet terminal according to the Beidou communication module serial number and the wallet serial number, wherein there is one or more corresponding target digital currency wallet terminals.

According to one or more embodiments of the present disclosure, after the step of coding the remote control instruction according to a Beidou message protocol to obtain a target message, the remote control method further includes:

coding the remote control instruction according to the Beidou message protocol to obtain a message; and splitting the message according to a message transmission capability corresponding to the Beidou satellite system to obtain the target message.

A remote control method for a digital currency wallet according to the embodiments of the present disclosure is applied to a digital currency wallet terminal, and includes:

receiving a target message forwarded by a Beidou satellite system;

decoding the target message to obtain a remote control instruction, wherein the remote control instruction indicates an operation manner corresponding to a target digital currency wallet terminal; and performing a corresponding operation according to the operation manner to achieve offline remote control.

According to one or more embodiments of the present disclosure, if the remote control instruction obtained after decoding is encrypted and signed via a digital currency platform, the remote control method further includes:

decrypting the remote control instruction; and verifying a signature corresponding to the decrypted remote control instruction.

In order to achieve the above objectives, according to still another aspect of the embodiments of the present disclosure, a digital currency wallet management apparatus is provided.

A digital currency wallet management apparatus according to the embodiments of the present disclosure is arranged at a digital currency wallet terminal, and includes a digital currency wallet, a satellite timing module, an offline determining module, and a transceiver module, wherein the digital currency wallet is configured to detect a connection state with a digital currency platform;

the satellite timing module is configured to obtain a current moment by means of a communication satellite in a case that the connection state with the digital currency platform indicates an offline state;

the digital currency wallet is configured to calculate an offline duration according to the current moment and a self-saved last synchronization moment;

the offline determining module is configured to determine whether the offline duration is greater than a preset offline duration; and the transceiver module is configured to: in a case that it is determined that the offline duration is greater than the preset offline duration, generate a wallet key information set, and send the wallet key information set to the digital currency platform, so that the digital currency platform synchronizes and processes the wallet key information set.

In order to achieve the above objectives, according to yet another aspect of the embodiments of the present disclosure, a remote control apparatus for a digital currency wallet is provided.

A remote control apparatus for a digital currency wallet according to the embodiments of the present disclosure is arranged at a digital currency platform, and includes:

a remote control instruction generation module, configured to: set a remote control triggering condition according to a service security requirement, and in a case that the remote control triggering condition is satisfied, generate a remote control instruction, wherein the remote control instruction indicates a wallet serial number and operation manner corresponding to a target digital currency wallet terminal; and a sending module, configured to: send the remote control instruction to a Beidou satellite system, so that: the Beidou satellite system forwards, according to the wallet serial number, the remote control instruction in the form of a message to the target digital currency wallet terminal that is in an offline state.

A remote control apparatus for a digital currency wallet according to the embodiments of the present disclosure is arranged at a Beidou satellite system, and includes:

a receiving module, configured to receive a remote control instruction sent by a digital currency platform, wherein the remote control instruction indicates a wallet serial number and operation manner corresponding to a target digital currency wallet terminal;

a coding module, configured to: code the remote control instruction according to a Beidou message protocol to obtain a target message, and send the target message to a Beidou satellite; and the Beidou satellite, configured to: forward the target message to the target digital currency wallet terminal according to the wallet serial number, so that: the target digital currency wallet terminal decodes the target message to obtain the remote control instruction, and achieves offline remote control according to the operation manner indicated in the remote control instruction.

A remote control apparatus for a digital currency wallet according to the embodiments of the present disclosure is arranged at a digital currency wallet terminal, and includes:

a message receiving module, configured to receive a target message forwarded by a Beidou satellite system;

a decoding module, configured to decode the target message to obtain a remote control instruction, wherein the remote control instruction indicates an operation manner corresponding to a target digital currency wallet terminal; and a remote control module, configured to perform a corresponding operation according to the operation manner to achieve offline remote control.

In order to achieve the above objectives, according to still yet another aspect of the embodiments of the present disclosure, a digital currency wallet management system is provided.

A digital currency wallet management system according to the embodiments of the present disclosure includes a digital currency management platform, a communication satellite, and the digital currency wallet management apparatus according to the above disclosed embodiment, wherein the digital currency management platform is configured to: receive wallet key information set sent by the digital currency wallet management apparatus, and synchronize and process the wallet key information set; and the communication satellite is configured to: receive a current moment acquiring request sent by the digital currency wallet management apparatus, and return a current moment to the digital currency wallet manage-ment apparatus in response to the current moment acquiring request.

A remote control system for a digital currency wallet according to the embodiments of the present disclosure includes a digital currency platform, a Beidou satellite system, and at least one digital currency wallet terminal, wherein the digital currency platform is configured to: set a remote control triggering condition according to a service security requirement; in a case that the remote control triggering condition is satisfied, generate a remote control instruction; and send the remote control instruction to the Beidou satellite system, wherein the remote control instruction indicates a wallet serial number and operation manner corresponding to a target digital currency wallet terminal;

the Beidou satellite system is configured to: receive the remote control instruction sent by the digital currency platform, code the remote control instruction according to a Beidou message protocol to obtain a target message, and forward, according to the wallet serial number, the target message to the target digital currency wallet terminal that is in an offline state; and the digital currency wallet terminal is configured to: receive the target message forwarded by the Beidou satellite system, decode the target message to obtain the remote control instruction, and perform a corresponding operation according to the operation manner indicated by the remote control instruction to achieve offline remote control.

In order to achieve the above objectives, according to a further aspect of the embodiments of the present disclosure, an electronic device is provided.

The electronic device according to the embodiments of the present disclosure includes: one or more processors; and a memory apparatus, configured to store one or more programs, wherein the one or more programs, when executed by the one or more processors, cause the one or more processors to implement the digital currency wallet management method or the remote control methods for the digital currency wallet of the embodiments of the present disclosure.

In order to achieve the above objectives, according to still a further aspect of the embodiments of the present disclosure, a computer-readable storage medium is provided.

The computer-readable storage medium according to the embodiments of the present disclosure stores a computer program. The program, when executed by a processor, implements the digital currency wallet management method or the remote control methods for the digital currency wallet of the embodiments of the present disclosure.

The further effects of the non-conventional optional methods mentioned above will be explained below in conjunction with specific implementations.

BRIEF DESCRIPTION OF THE DRAWINGS

The accompanying drawings are configured to better understand the present disclosure, and will not constitute an improper limitation on the present disclosure. Where:

FIG. 1 is a schematic diagram of main steps of a digital currency wallet management method according to the embodiments of the present disclosure;

FIG. 4 is a schematic diagram of another digital currency wallet management system according to the embodiments of the present disclosure;

FIG. 5 is a schematic diagram of main flows of a remote control method for a digital currency wallet according to the embodiments of the present disclosure;

FIG. 6 is a schematic diagram of main flows of another remote control method for a digital currency wallet according to the embodiments of the present disclosure;

FIG. 7 is a schematic diagram of main flows of still another remote control method for a digital currency wallet according to the embodiments of the present disclosure;

DETAILED DESCRIPTION OF THE EMBODIMENTS

Figure 2:
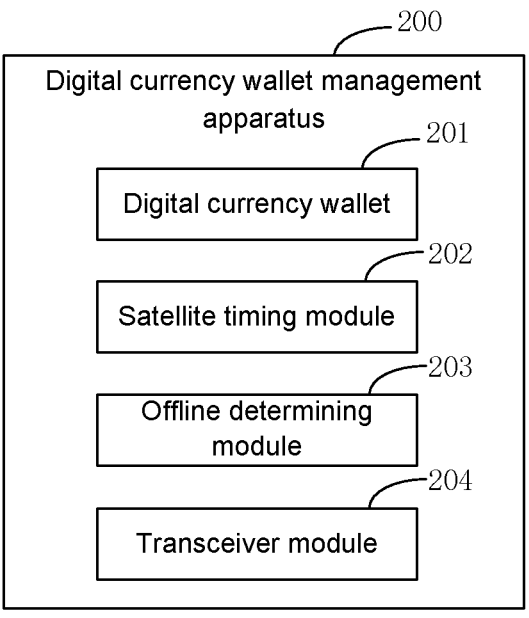
FIG. 2 is a schematic diagram of main modules of a digital currency wallet management apparatus according to the embodiments of the present disclosure.

The following is an explanation of the exemplary embodiments of the present disclosure in conjunction with the accompanying drawings, which includes various details of the embodiments of the present disclosure to help understanding. They should be considered as being merely exemplary. Therefore, those of ordinary skill in the art should realize that various changes and modifications can be made to the embodiments described herein, without departing from the scope and spirit of the present disclosure. Similarly, for clarity and conciseness, the descriptions below omit the descriptions of well-known functions and structures.

It should be noted that, without conflicts, the embodiments of the present disclosure and the technical features in the embodiments can be combined with each other.

FIG. 1 is a schematic diagram of main steps of a digital currency wallet management method according to the embodiments of the present disclosure.

As shown in FIG. 1, a digital currency wallet management method according to the embodiments of the present disclosure is applied to a digital currency wallet terminal, and mainly includes the following steps:

Step S101: A connection state with a digital currency platform is detected.

In the embodiments of the present disclosure, it is possible that a connection request with the digital currency platform is sent for at least once; and a connection result of the connection request is detected, and the connection state with the digital currency platform is determined according to the connection result.

As at least one alternative embodiment, a digital currency wallet may regularly send a heartbeat signal to the digital currency platform to detect whether the connection state with the digital currency platform is an offline state; or, the digital currency wallet may send the connection request to the digital currency platform for at least once every time one transaction request has been received, so as to detect whether the connection state with the digital currency platform is an offline state; or, the digital currency wallet may send the connection request to the digital currency platform for at least once every time when the digital currency wallet has finished processing one transaction request, so as to detect whether the connection state with the digital currency platform is an offline state; or, the number of the received transaction requests may be progressively increased at the digital currency wallet, and when the number is greater than a preset number threshold, the digital currency wallet sends the connection request with the digital currency platform for at least once, so as to detect whether the connection state with the digital currency platform is an offline state.

Step S102: A current moment is obtained by means of a communication satellite in a case that the connection state with the digital currency platform indicates an offline state.

In the embodiments of the present disclosure, the current moment may be obtained from a satellite by means of a satellite timing module in a case that the connection state with the digital currency platform indicates the offline state.

As at least one alternative embodiment, the satellite timing module may be a single-mode module that only supports communications with a Beidou satellite. At this time, the satellite timing module directly sends a latest moment acquiring request to the Beidou satellite and takes a first latest moment returned by the Beidou satellite as the current moment.

The satellite timing module may also be a Beidou/GPS dual-mode module that supports communications with both a Beidou satellite and a GPS satellite. At this time, the satellite timing module sends a latest moment acquiring request to the Beidou satellite and the GPS satellite respectively. The satellite timing module may directly take a time value that is returned at first as the current moment. After receiving a first latest moment returned by the Beidou satellite and a second latest moment returned by the GPS satellite and recording a first return duration of the Beidou satellite and a second return duration of the GPS satellite, the satellite timing module may further determine whether the first return duration is less than the second return duration; if yes, the satellite timing module takes the first latest moment as the current moment; and if not, the satellite timing module takes the second latest moment as the current moment. The satellite timing module may also send both the first latest moment and the second latest moment to the digital currency wallet, and the digital currency wallet selects the current moment according to a preset service policy.

Step S103: An offline duration is calculated according to the current moment and a self-saved last synchronization moment.

In the embodiments of the present disclosure, the digital currency wallet stores a synchronization moment of the last synchronization performed on the digital currency platform. Therefore, the digital currency wallet may calculate its offline duration according to the current moment and the last synchronization moment.

In the embodiments of the present disclosure, after the offline duration of the digital currency wallet is calculated, the synchronization moment saved in the digital currency wallet may be updated as the current moment.

Step S104: Whether the offline duration is greater than a preset offline duration is determined.

In the embodiments of the present disclosure, the digital currency wallet corresponds to the preset offline duration, and the preset offline duration can be adjusted by a developer according to a service requirement. For example, for a digital currency wallet used in a service that is sensitive to transaction time, the preset offline duration of the digital currency wallet may be set to be shorter, so that the digital currency wallet can synchronize transaction data with a digital trading platform as soon as possible. For a digital currency wallet used in a service that is not sensitive to transaction time, the preset offline duration of the digital currency wallet can be set to be longer to alleviate a network load of synchronizing transaction data between the digital currency wallet and the digital trading platform.

Step S105: In a case that it is determined that the offline duration is greater than the preset offline duration, a wallet key information set is generated, and the wallet key information set is sent to the digital currency platform, so that the digital currency platform synchronizes and processes the wallet key information set.

In the embodiments of the present disclosure, in a case that it is determined that the offline duration of the digital currency wallet is greater than the preset offline duration, the method further includes: The digital currency wallet is locked, and the step that a wallet key information set is generated is executed according to wallet key information stored in the digital currency wallet. The wallet key information includes, but is not limited to, any one or more pieces of the following information: time information, positioning information, the offline duration, digital currency information, and transaction information.

In the embodiments of the present disclosure, the process of generating a wallet key information set according to wallet key information stored in the digital currency wallet includes: the wallet key information is encrypted to obtain encrypted wallet key information; and the encrypted wallet key information is signed to obtain a signature identifier, and the encrypted wallet key information and the signature identifier are taken as the wallet key information set, thereby ensuring that the wallet key information in a transmission process will not be revealed and also avoiding that the wallet key information is counterfeited in the transmission process.

In the embodiments of the present disclosure, the process of sending the wallet key information set to the digital currency platform includes: the wallet key information set is uploaded to the Beidou satellite and/or the GPS satellite, so that the Beidou satellite and/or the GPS satellite sends the wallet key information set to the digital currency platform, and the digital currency platform synchronizes and processes the wallet key information set.

In the embodiments of the present disclosure, the wallet key information set is uploaded to the Beidou satellite and/or the GPS satellite, which includes: The wallet key information set is written into a message to be sent; whether a length of the message is greater than a length corresponding to a message communication capability of the message is determined; in a case that it is determined that the length of the message is greater than the length corresponding to the message communication capability of the message, the message is split according to the message communication capability; and the split message is sent to the Beidou satellite and/or the GPS satellite.

In a preferred embodiment of the present disclosure, a Beidou module uploads the wallet key information set to the Beidou satellite, wherein the wallet key information set may further include a message identifier area. The message identifier area indicates a type of the message to be sent, and the type includes a global short message type and a regional short message type. The Beidou module may determine to use which short message communication capability according to the message identifier area. As at least one alternative embodiment, if the message to be sent is a global short message, the Beidou module uses a 560-bit communication capability. If the message to be sent is a regional short message, the Beidou module uses a 14000-bit communication capability.

After the Beidou module writes the wallet key information set into the message to be sent, whether the length of the message is greater than the length corresponding to the message communication capability needs to be determined, that is, whether the length of the message to be sent exceeds a load of a single message needs to be determined: If the message to be sent is the global short message, the load of the single message is 560 bits. If the message to be sent is the regional short message, the load of the single message is 14000 bits. If the length of the message to be sent exceeds the load of the single message, the Beidou module is responsible for splitting the message to be sent into a plurality of short messages and sending the plurality of short messages.

In the embodiments of the present disclosure, in a case that it is determined that the length of the message is not greater than the message communication capability of the message, the Beidou module directly sends the message to the Beidou satellite. In a preferred embodiment of the present disclosure, the Beidou module uses a Radio Determination Satellite Service (RDSS) protocol to encapsulate and send the message to be sent or the split message.

In the embodiments of the present disclosure, the Beidou module sends the message to be sent or the split message to the Beidou satellite, and the Beidou satellite uses the RDSS protocol to forward the message to a receiver Beidou module. The receiver Beidou module may be a third-party Beidou operator service module or a self-built Beidou service module.

The receiver the Beidou module receives a RDSS signal sent by the Beidou satellite, and decodes the RDSS signal to obtain the message or the split message. If the non-split message is obtained, the receiver Beidou module directly submits the message to a Beidou gateway. If the split message is obtained, the receiver Beidou module is responsible for combining the split message to obtain the complete message, and then submitting the complete message to a Beidou gateway.

The Beidou gateway parses the wallet key information set from the message and submits the wallet key information set to the digital currency platform. The digital currency platform performs signature verification, decryption, synchronization, and processing operations on the wallet key information set.

In the embodiments of the present disclosure, after the wallet key information set is sent to the digital currency platform, the method further includes: whether synchronization success information returned by the digital currency platform has been received is monitored; and in a case that the synchronization success information has not been received within a preset duration, the wallet key information set is resent to the digital currency platform, and the step that whether synchronization success information returned by the digital currency platform has been received is monitored is executed, thereby ensuring that the digital currency platform has received the wallet key information set and improving the accuracy of synchronization of the digital currency platform.

From the digital currency wallet management method according to the embodiments of the present disclosure, it can be seen that the method can obtain the current moment by means of the communication satellite in a case that the connection state with the digital currency platform indicates the offline state, and calculate the offline duration; and in a case that it is determined that the offline duration is greater than the preset offline duration, generate the wallet key information set, and send the wallet key information set to the digital currency platform, so that the digital currency platform synchronizes and processes the wallet key information set, thereby ensuring the clock accuracy of the digital currency wallet in an offline period and further ensuring the accuracy of transaction information.

FIG. 2 is a schematic diagram of main modules of a digital currency wallet management apparatus according to the embodiments of the present disclosure.

As shown in FIG. 2, the digital currency wallet management apparatus 200 according to the embodiments of the present disclosure is arranged at a digital currency wallet terminal, and includes a digital currency wallet 201, a satellite timing module 202, an offline determining module 203, and a transceiver module 204, wherein the digital currency wallet 201 is configured to detect a connection state with a digital currency platform;

the satellite timing module 202 is configured to obtain a current moment by means of a communication satellite in a case that the connection state with the digital currency platform indicates an offline state;

the digital currency wallet 201 is configured to calculate an offline duration according to the current moment and a self-saved last synchronization moment;

the offline determining module 203 is configured to determine whether the offline duration is greater than a preset offline duration; and the transceiver module 204 is configured to: in a case that it is determined that the offline duration is greater than the preset offline duration, generate a wallet key information set, and send the wallet key information set to the digital currency platform, so that the digital currency platform synchronizes and processes the wallet key information set.

In the embodiments of the present disclosure, in a case that the connection state with the digital currency platform indicates the offline state, the satellite timing module 202 is further configured to: send a latest moment acquiring request to a Beidou satellite and a GPS satellite; receive a first latest moment returned by the Beidou satellite and a second latest moment returned by the GPS satellite, and record a first return duration of the Beidou satellite and a second return duration of the GPS satellite; and determine whether the first return duration is less than the second return duration, if yes, take the first latest moment as the current moment, and if not, take the second latest moment as the current moment.

In the embodiments of the present disclosure, in a case that it is determined that the offline duration of the digital currency wallet is greater than the preset offline duration, the transceiver module 204 is further configured to: lock the digital currency wallet, and execute, according to self-saved wallet key information, the step of generating a wallet key information set.

In the embodiments of the present disclosure, the wallet key information includes any one or more pieces of the following information: time information, positioning information, the offline duration, digital currency information, and transaction information; and the transceiver module 204 is further configured to: encrypt the wallet key information to obtain encrypted wallet key information; and sign the encrypted wallet key information to obtain a signature identifier, and take the encrypted wallet key information and the signature identifier as the wallet key information set.

In the embodiments of the present disclosure, the transceiver module 204 is further configured to: upload the wallet key information set to the Beidou satellite and/or the GPS satellite, so that the Beidou satellite and/or the GPS satellite sends the wallet key information set to the digital currency platform, and the digital currency platform synchronizes and processes the wallet key information set.

In a preferred embodiment of the present disclosure, the transceiver module 204 adopts a Beidou module. In this case, the Beidou module uploads the wallet key information set to the Beidou satellite.

In the embodiments of the present disclosure, the transceiver module 204 is further configured to: write the wallet key information set into a message to be sent; determine whether a length of the message is greater than a length corresponding to a message communication capability of the message; in a case that it is determined that the length of the message is greater than the length corresponding to the message communication capability of the message, split the message according to the message communication capability; and send the split message to the Beidou satellite and/or the GPS satellite.

In the embodiments of the present disclosure, after sending the wallet key information set to the digital currency platform, the transceiver module 204 is further configured to: monitor whether synchronization success information returned by the digital currency platform has been received; and in a case that the synchronization success information has not been received within a preset duration, resend the wallet key information set to the digital currency platform, and execute the step of monitoring whether synchronization success information returned by the digital currency platform has been received, thereby ensuring that the digital currency platform has received the wallet key information set and improving the accuracy of synchronization of the digital currency platform.

In the embodiments of the present disclosure, the digital currency wallet 201 is further configured to: send a connection request with the digital currency platform for at least once; and detect a connection result of the connection request, and determine the connection state with the digital currency platform according to the connection result.

In the embodiments of the present disclosure, the digital currency wallet 201 is further configured to: regularly send a heartbeat signal to the digital currency platform to detect the connection state with the digital currency platform; or, send the connection request to the digital currency platform according to a received transaction request, so as to detect the connection state with the digital currency platform.

In the embodiments of the present disclosure, the digital currency wallet 201 is further configured to: send the connection request to the digital currency platform for at least once every time one transaction request has been received, so as to detect the connection state with the digital currency platform; or progressively increase the number of the received transaction requests, and when the number is greater than a preset number threshold, send the connection request to the digital currency platform for at least once, so as to detect the connection state with the digital currency platform.

Figure 3:
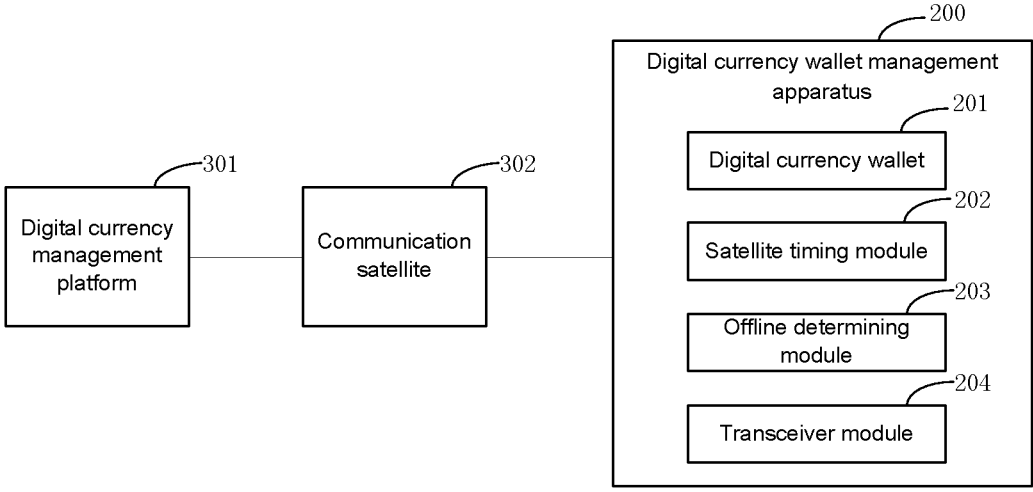
FIG. 3 is a schematic diagram of a digital currency wallet management system according to the embodiments of the present disclosure.

FIG. 3 is a schematic diagram of a digital currency wallet management system according to the embodiments of the present disclosure.

As shown in FIG. 3, the digital currency wallet management system 300 according to the embodiments of the present disclosure includes a digital currency management platform 301, a communication satellite 302, and the digital currency wallet management apparatus 200 according to any of the above disclosed embodiments. Where:

the digital currency management platform 301 is configured to: receive wallet key information set sent by the digital currency wallet management apparatus 200, and synchronize and process the wallet key information set; and the communication satellite 302 is configured to: receive a current moment acquiring request sent by the digital currency wallet management apparatus, and return a current moment to the digital currency wallet management apparatus in response to the current moment acquiring request.

In the embodiments of the present disclosure, after receiving the wallet key information set sent by the digital currency wallet management apparatus 200, the digital currency platform 301 is further configured to: return synchronization success information to the digital currency wallet management apparatus 200 by means of the communication satellite 302, so that the digital currency wallet management apparatus 200 confirms that the digital currency platform 301 has successfully synchronized the wallet key information set.

In the embodiments of the present disclosure, the digital currency wallet management system 300 may further include a receiver Beidou module 303 and a Beidou gateway 304. The digital currency wallet management system at this time is as shown in FIG. 4, where:

The receiver Beidou module 303 is configured to: receive an RDss signal sent by the Beidou satellite, and decode the RDSS signal to obtain a message or a split message. If the non-split message is obtained, the receiver Beidou module 303 directly submits the message to the Beidou gateway 304. If the split message is obtained, the receiver Beidou module 303 is responsible for combining the split message to obtain the complete message, and then submitting the complete message to the Beidou gateway 304.

The Beidou gateway 304 is configured to: parse the wallet key information set from the message and submit the wallet key information set to the digital currency platform 301.

In the embodiments of the present disclosure, the digital currency platform 301 is further configured to: maintain a Beidou module communication number corresponding to the digital currency wallet management apparatus 200; receive the wallet key information set uploaded by the digital currency wallet management apparatus 200, and perform signature verification and decryption on the wallet key information set according to an agreed secret key to ensure the validity and credibility of wallet key information; obtain any one or more pieces of wallet key information after the decryption: time information, positioning information, the offline duration, digital currency information, transaction information, and the like; and synchronize and process the obtained wallet key information.

FIG. 5 is a schematic diagram of main flows of a remote control method for a digital currency wallet according to the embodiments of the present disclosure. As shown in FIG. 5, the remote control method for the digital currency wallet according to the embodiments of the present disclosure is applied to a digital currency platform, and mainly includes:

Step S501: A remote control triggering condition is set according to a service security requirement, and in a case that the remote control triggering condition is satisfied, a remote control instruction is generated, wherein the remote control instruction indicates a wallet serial number and operation manner corresponding to a target digital currency wallet terminal.

According to the embodiments of the present disclosure, a remote management module of the digital currency platform is configured to monitor stored lists of risk wallet serial numbers such as a blacklist and a grey list, and monitor whether the digital currency platform or a digital currency wallet terminal has been subjected to a network attack, so as to formulate the remote control triggering condition in accordance with the service security requirement. When the remote control triggering condition is satisfied, that is, when a security factor corresponding to the digital currency wallet in its current state is low, which easily leads to an economic loss, the digital currency wallet needs to be remotely controlled by the digital currency platform to avoid possible risks, thereby ensuring the security of digital currency assets of a user.

As at least one alternative embodiment, according to the embodiments of the present disclosure, the above wallet serial number corresponding to the target digital currency wallet terminal is determined according to the remote control triggering condition that is satisfied; and the remote control triggering condition includes one or more of the following:

a risk level corresponding to the digital currency platform and/or a risk level corresponding to any digital currency wallet terminal exceeds a risk level threshold; and a risk wallet serial number list stored in any digital currency wallet terminal is inconsistent with a risk wallet serial number list stored in the digital currency platform.

According to the embodiments of the present disclosure, the risk level threshold is set according to an actual situation, and a risk corresponding to the digital currency platform or the digital currency wallet terminal mainly refers to, for example, a network attack.

The digital currency platform monitors wallet accounts in different regions (such as nationwide and worldwide), and writes serial numbers corresponding to risky wallet accounts (the accounts and the serial numbers may be the same, the serial numbers can be set separately) into a risk wallet serial number list. According to a specific implementation of the embodiments of the present disclosure, an updated full risk wallet serial number list or a portion (a newly added or deleted portion) of risk wallet serial numbers that have changed may be regularly sent to the digital currency wallet terminals in corresponding regions or may be updated in real time. A sending manner and a sent data volume can be adjusted according to an actual situation.

Through the above settings, the remote control instruction may be generated if the remote control triggering condition is satisfied. The remote control instruction is then sent in the form of a message to a corresponding digital currency wallet terminal (namely, the target digital currency wallet terminal) by means of a Beidou satellite system, so that even if the digital currency wallet terminal is in an offline state, or in a case that a current mobile cellular communication has a poor communication signal (in this case, signals are easily interfered), the digital currency wallet terminal can still be remotely controlled, and the remote control effect can be ensured.

Optionally, according to the embodiments of the present disclosure, after the step that a remote control instruction is generated, the above method further includes:

The remote control instruction is encrypted; and the encrypted remote control instruction is signed.

According to a specific implementation of the embodiments of the present disclosure, remote control instruction S (including but not limited to an instruction code, an instruction seqID, instruction issuance time, and a message area to which the instruction is sent (regional short message/global short message, which can be used to determine a wallet serial number and Beidou communication module serial number of the target digital currency wallet terminal that needs to be remotely controlled, namely, that receives the remote control instruction)) is encrypted using an agreed secret key to obtain S'. Further, a hash value hash of encrypted remote control instruction S' is signed to obtain a sign value.

According to the embodiments of the present disclosure, the generated remote control instruction may be encrypted according to a preset secret key (This is exemplary only, and any other existing encryption manners may also be used) to avoid tampering with the remote control instruction, or the like. Meanwhile, whether to sign the remote control instruction may be determined according to an actual situation. It is easily understood that signing the remote control instruction helps the digital currency wallet terminal that later receives the remote control instruction to ensure the validity and credibility of the remote control instruction by means of signature verification, which further ensures the remote control effect.

Step S502: The remote control instruction is sent to a Beidou satellite system, so that: the Beidou satellite system forwards, according to the wallet serial number, the remote control instruction in the form of a message to the target digital currency wallet terminal that is in an offline state to achieve offline remote control of the target digital currency wallet terminal.

As at least one alternative embodiment, according to the embodiments of the present disclosure, the above remote control instruction includes a transaction restriction instruction, so that the target digital currency wallet terminal that has received the transaction restriction instruction stops an offline transaction.

As at least one alternative embodiment, when the remote control triggering condition that is satisfied includes "The risk level corresponding to the digital currency platform and/or the risk level corresponding to any digital currency wallet terminal exceeds the risk level threshold", sending a transaction restriction instruction to the corresponding digital currency wallet terminal (namely, the target digital currency wallet terminal) helps the target digital currency wallet terminal to lock the wallet terminal after receiving the transaction restriction instruction and to temporarily stop the transaction.

As at least one alternative embodiment, according to the embodiments of the present disclosure, the remote control instruction may further include an updated risk wallet serial number list. When the remote control triggering condition that is satisfied includes "The risk wallet serial number list stored in any digital currency wallet terminal is inconsistent with the risk wallet serial number list stored in the digital currency platform", after receiving a remote digital instruction, the target digital currency wallet terminal determines whether the wallet serial number of a counterparty belongs to the updated risk wallet serial number list. If yes, namely, if the digital currency wallet of the counterparty belongs to a risky digital currency wallet, the transaction will be temporarily stopped. If no, that is, if the digital currency wallet of the counterparty does not belong to a risky digital currency wallet, the transaction may continue. Through the above settings, different remote control instructions may be generated according to actual situations and the remote control triggering conditions that are satisfied, so that a digital currency wallet terminal of a user may be remotely controlled in a case of poor mobile cellular communication signals, especially, in offline situations, which ensures the security of assets of the digital currency wallet of the user.

As at least one alternative embodiment, according to the embodiments of the present disclosure, the above method further includes:

The digital currency platform may send the remote control instruction in a broadcast, multicast, or unicast manner.

Through the above settings, different sending manners may be flexibly selected according to the number of target digital currency wallet terminals corresponding to transmitted remote control instructions, regions where the target digital currency wallet terminals belong, and types of the transmitted remote control instructions, thereby improving the sending efficiency of the remote control instruction.

According to the technical solutions of the embodiments of the present disclosure, since the remote control triggering condition is set according to the service security requirement, the remote control instruction is generated if the remote control triggering condition is satisfied, wherein the remote control instruction indicates the wallet serial number and operation manner corresponding to the target digital currency wallet terminal; the remote control instruction is sent to the Beidou satellite system, so that the Beidou satellite system forwards, according to the wallet serial number, the remote control instruction in the form of a message to the target digital currency wallet terminal that is in the offline state, so as to achieve the offline remote control of the target digital currency wallet terminal, the technical problems of low security factor and poor remote control effect on the digital currency wallet caused by the fact that it is hard for the existing method to remotely control the digital currency wallet that is in the offline state are solved. Thus, in an offline mode, the Beidou satellite system sends the remote control instruction generated by the digital currency platform to the digital currency wallet terminal to remotely control the digital currency wallet that is in the offline state. This achieves the technical effects of significantly increasing the security factor of the digital currency wallet terminal, enhancing the remote control effect, and improving the anti-interference capability of forwarded information.

FIG. 6 is a schematic diagram of main flows of another remote control method for a digital currency wallet according to the embodiments of the present disclosure. As shown in FIG. 6, the remote control method for the digital currency wallet according to the embodiments of the present disclosure is applied to a Beidou satellite system, and mainly includes:

Step S601: A remote control instruction sent by a digital currency platform is received, wherein the remote control instruction indicates a wallet serial number and operation manner corresponding to a target digital currency wallet terminal.

As at least one alternative embodiment, according to the embodiments of the present disclosure, the Beidou satellite system receives the remote control instruction sent by the digital currency platform by means of a Beidou gateway. According to a specific implementation of the embodiments of the present disclosure, the digital currency platform sends the remote control instruction to the Beidou satellite system by means of unvarnished transmission (namely, the unvarnished transmission refers to only transmitting a service that needs to be transmitted to a destination node while ensuring the transmission quality, without processing the transmitted service. This is exemplary only, and existing transmission manners that can ensure the transmission quality can also be used). The Beidou satellite system uses a Beidou module corresponding to the digital currency platform to receive the remote control instruction sent by the digital currency platform by means of the Beidou gateway. Where the Beidou gateway mainly serves as a medium that connects the digital currency platform with the Beidou satellite system (mainly a Beidou communication module under the Beidou satellite system, hereinafter referred to as Beidou module).

According to the embodiments of the present disclosure, since the digital currency platform often needs to send a large batch of remote control instructions (for example, for the updated risky wallet serial number list), remote control instructions often need to be sent to a plurality of digital currency wallet terminals in a region (this is mainly for digital currency wallet terminals that have poor signals or in offline states in the region)), the Beidou gateway may be used to send the remote control instructions to the appropriate Beidou module, and then the Beidou satellite system forwards the remote control instructions to the plurality of digital currency wallet terminals respectively.

Step S602: The remote control instruction is coded according to a Beidou message protocol to obtain a target message.

Through the above settings, the remote control instruction is coded into the message according to the Beidou message protocol, so that the remote control instruction may be forwarded offline by using the unique short message communication capability of the Beidou satellite system. In addition, due to the problems that the existing mobile cellular communications such as 2G/3G/4G/5G, NB-IOT, and WIFI have a limited coverage range and are easily interfered in emergencies, when a communication signal of the mobile cellular communication is relatively weak, the remote control instruction can also be forwarded using the communication capability of the Beidou satellite system.

As at least one alternative embodiment, according to the embodiments of the present disclosure, after the step that the remote control instruction is coded according to a Beidou message protocol to obtain a target message, the above method further includes:

The remote control instruction is coded according to the Beidou message protocol to obtain a message; and the message is split according to a message transmission capability corresponding to the Beidou satellite system to obtain the target message.

According to a specific implementation of the embodiments of the present disclosure, the Beidou communication module determines, according to a signal sending range (area), the short message communication capability adopted. For example, the 560-bit transmission capability is adopted for a global short message, and the 14000-bit capability is adopted for a regional short message. If a length (S'+sign) of the message obtained after the remote control instruction to be sent is coded exceeds a load of a single message, the Beidou module is responsible for splitting the long message into a plurality of short messages for sending.

According to the embodiments of the present disclosure, there is a certain difference in the single communication capability (namely, the load of the single transmitted message and a corresponding time interval) of the Beidou satellite system according to different radiation ranges of transmitted/sent information. If the length of the message determined after the remote control instruction is coded exceeds the single message transmission capability of the Beidou satellite system, the message may be split to obtain the plurality of short messages (namely, the target messages).

Step S603: The target message is forwarded to the target digital currency wallet terminal according to the wallet serial number, so that the target digital currency wallet terminal decodes the target message to obtain the remote control instruction, and achieves offline remote control according to the operation manner indicated in the remote control instruction.

According to a specific implementation of the embodiments of the present disclosure, the target message is sent out by means of a Beidou short message antenna, and the Beidou satellite receives the signal and forwards the signal. A plurality of short messages will be sent separately if any.

As at least one alternative embodiment, according to the embodiments of the present disclosure, the remote control instruction further indicates a Beidou communication module serial number corresponding to the target digital currency wallet terminal; and the target message is forwarded to the target digital currency wallet terminal according to the wallet serial number, which includes:

The target message is forwarded to the target digital currency wallet terminal according to the Beidou communication module serial number and the wallet serial number, wherein there is one or more corresponding target digital currency wallet terminals.

As at least one alternative embodiment, according to the embodiments of the present disclosure, the remote control instruction is sent in the form of a message to the Beidou communication module of the target digital currency wallet according to the Beidou communication module serial number and the wallet serial number, so that the Beidou communication module may decode the remote control instruction in the form of a message, and then the target digital currency wallet may achieve the remote control in the offline state or in a case of weak signals after performing decryption, signature verification, and the like on the corresponding decoded remote control instruction.

Through the above settings, even if the digital currency wallet terminal is in an offline state, or in a case that a current mobile cellular communication has a poor communication signal (in this case, signals are easily interfered), the digital currency wallet terminal can still be remotely controlled, and the remote control effect can be ensured.

FIG. 7 is a schematic diagram of main flows of another remote control method for a digital currency wallet according to the embodiments of the present disclosure. As shown in FIG. 7, the remote control method for the digital currency wallet according to the embodiments of the present disclosure is applied to a digital currency wallet terminal, and mainly includes:

Step S701: A target message forwarded by a Beidou satellite system is received.

As at least one alternative embodiment, according to the embodiments of the present disclosure, for the target message forwarded by the Beidou satellite system, a Beidou communication module (corresponding to a Beidou communication module serial number indicated in the remote control instruction and corresponding to the target digital currency wallet terminal) set at a target digital currency wallet terminal is used to receive the target message, so that the Beidou communication module may later decode the target message to obtain the remote control instruction. As at least one alternative embodiment, after obtaining the remote control instruction by decoding, the Beidou communication module of the target digital currency wallet terminal may send the remote control instruction to a decryption module of the target digital currency wallet terminal for decryption by means of a middleware. Where the middleware is responsible for monitoring Beidou short message notifications, and submitting monitored Beidou short message ciphertexts to a digital currency wallet by means of a serial port, a USB, a bus, and the like. The middleware may exist separately or be integrated with the digital currency wallet as needed.

Step S702: The target message is decoded to obtain a remote control instruction, wherein the remote control instruction indicates an operation manner corresponding to a target digital currency wallet terminal.

As at least one alternative embodiment, according to the embodiments of the present disclosure, if the target message includes a plurality of short messages, the above method further includes:

Some remote control instructions obtained after the plurality of short messages are decoded are combined to obtain a remote control instruction.

As at least one alternative embodiment, according to the embodiments of the present disclosure, if the remote control instruction obtained after decoding is encrypted and signed via a digital currency platform, the above method further includes:

The remote control instruction is decrypted; and
a signature corresponding to the decrypted remote control instruction is verified.

According to the embodiments of the present disclosure, the encrypted remote control instruction may be decrypted according to a preset secret key (This is exemplary only, and any other existing encryption manners can also be used). The digital currency wallet decrypts the remote control instruction to obtain an instruction code, an instruction seqID, instruction issuance time, and other information, and a remote control module performs a corresponding remote control operation according to a service rule. Meanwhile, the digital currency wallet terminal that has received the remote control instruction ensures the validity and credibility of the remote control instruction by means of signature verification, which further ensures the remote control effect.

Step S703: A corresponding operation is performed according to the operation manner to achieve offline remote control.

As at least one alternative embodiment, according to the embodiments of the present disclosure, the above remote control instruction includes a transaction restriction instruction, so that the target digital currency wallet terminal that has received the transaction restriction instruction stops an offline transaction. That is, when the remote control triggering condition that is satisfied includes "The risk level corresponding to the digital currency platform and/or the risk level corresponding to any digital currency wallet terminal exceeds the risk level threshold", the target digital currency wallet terminal locks the wallet terminal after receiving the transaction restriction instruction and can temporarily stop the transaction.

As at least one alternative embodiment, according to the embodiments of the present disclosure, the remote control instruction may further include an updated risk wallet serial number list. When the remote control triggering condition that is satisfied includes "The risk wallet serial number list stored in any digital currency wallet terminal is inconsistent with the risk wallet serial number list stored in the digital currency platform", after receiving a remote digital instruction, the target digital currency wallet terminal determines whether the wallet serial number of a counterparty belongs to the updated risk wallet serial number list. If yes, namely, if the digital currency wallet of the counterparty belongs to a risky digital currency wallet, the transaction will be temporarily stopped. If no, that is, if the digital currency wallet of the counterparty does not belong to a risky digital currency wallet, the transaction may continue. Through the above settings, a digital currency wallet terminal of a user can be remotely controlled in a case of poor mobile cellular communication signals, especially, in offline situations, which ensures the security of assets of the digital currency wallet of the user.

Figure 8:
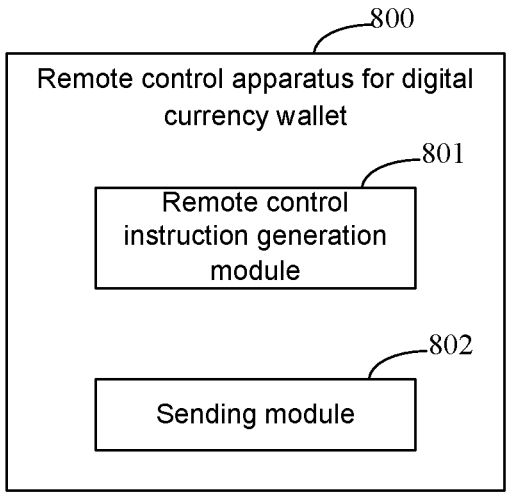
FIG. 8 is a schematic diagram of main modules of a remote control apparatus for a digital currency wallet according to the embodiments of the present disclosure.

FIG. 8 is a schematic diagram of main modules of a remote control apparatus for a digital currency wallet according to the embodiments of the present disclosure. As shown in FIG. 8, the remote control apparatus 800 for the digital currency wallet according to the embodiments of the present disclosure is arranged at a digital currency platform, and mainly includes:

a remote control instruction generation module 801, configured to: set a remote control triggering condition according to a service security requirement, and in a case that the remote control triggering condition is satisfied, generate a remote control instruction, wherein the remote control instruction indicates a wallet serial number and operation manner corresponding to a target digital currency wallet terminal.

According to the embodiments of the present disclosure, a remote management module of the digital currency platform is configured to monitor stored lists of risk wallet serial numbers such as a blacklist and a grey list, and monitor whether the digital currency platform or a digital currency wallet terminal has been subjected to a network attack, so as to formulate the remote control triggering condition in accordance with the service security requirement. When the remote control triggering condition is satisfied, that is, when a security factor corresponding to the digital currency wallet in its current state is low, which easily leads to an economic loss, the digital currency wallet needs to be remotely controlled by the digital currency platform to avoid possible risks, thereby ensuring the security of digital currency assets of a user.

As at least one alternative embodiment, according to the embodiments of the present disclosure, the above wallet serial number corresponding to the target digital currency wallet terminal is determined according to the remote control triggering condition that is satisfied; and the remote control triggering condition includes one or more of the following:

a risk level corresponding to the digital currency platform and/or the risk level corresponding to any digital currency wallet terminal exceeds a risk level threshold; and a risk wallet serial number list stored in any digital currency wallet terminal is inconsistent with a risk wallet serial number list stored in the digital currency platform.

According to the embodiments of the present disclosure, the risk level threshold is set according to an actual situation, and a risk corresponding to the digital currency platform or the digital currency wallet terminal mainly refers to, for example, a network attack.

The digital currency platform monitors wallet accounts in different regions (such as nationwide and worldwide), and writes serial numbers corresponding to risky wallet accounts (the accounts and the serial numbers can be the same, the serial numbers can be set separately) into a risk wallet serial number list. According to a specific implementation of the embodiments of the present disclosure, an updated full risk wallet serial number list or a portion (a newly added or deleted portion) of risk wallet serial numbers that have changed may be regularly sent to the digital currency wallet terminals in corresponding regions or may be updated in real time. A sending manner and a sent data volume may be adjusted according to an actual situation.

Through the above settings, the remote control instruction generation module 801 generates the remote control instruction if the remote control triggering condition is satisfied. The remote control instruction is then sent in the form of a message to a corresponding digital currency wallet terminal (namely, the target digital currency wallet terminal) by means of a Beidou satellite system, so that even if the digital currency wallet terminal is in an offline state, or in a case that a current mobile cellular communication has a poor communication signal (in this case, signals are easily interfered), the digital currency wallet terminal can still be remotely controlled, and the remote control effect can be ensured.

Exemplarily, according to the embodiments of the present disclosure, the remote control apparatus 800 for the digital currency wallet described above further includes a processing module. After the step of generating a remote control instruction, the processing module is configured to:

encrypt the remote control instruction; and
   sign the encrypted remote control instruction.

According to the embodiments of the present disclosure, the generated remote control instruction may be encrypted according to a preset secret key (This is exemplary only, and any other existing encryption manners can also be used) to avoid tampering with the remote control instruction, or the like. Meanwhile, whether to sign the remote control instruction may be determined according to an actual situation. It is easily understood that signing the remote control instruction helps the digital currency wallet terminal that later receives the remote control instruction to ensure the validity and credibility of the remote control instruction by means of signature verification, which further ensures the remote control effect.

a sending module 802, configured to: send the remote control instruction to a Beidou satellite system, so that: the Beidou satellite system forwards, according to the wallet serial number, the remote control instruction in the form of a message to the target digital currency wallet terminal that is in an offline state.

As at least one alternative embodiment, according to the embodiments of the present disclosure, the above remote control instruction includes a transaction restriction instruction, so that the target digital currency wallet terminal that has received the transaction restriction instruction stops an offline transaction.

As at least one alternative embodiment, when the remote control triggering condition that is satisfied includes "The risk level corresponding to the digital currency platform and/or the risk level corresponding to any digital currency wallet terminal exceeds the risk level threshold", sending a transaction restriction instruction to the corresponding digital currency wallet terminal (namely, the target digital currency wallet terminal) helps the target digital currency wallet terminal to lock the wallet terminal after receiving the transaction restriction instruction and to temporarily stop the transaction.

As at least one alternative embodiment, according to the embodiments of the present disclosure, the remote control instruction may further include an updated risk wallet serial number list. When the remote control triggering condition that is satisfied includes "The risk wallet serial number list stored in any digital currency wallet terminal is inconsistent with the risk wallet serial number list stored in the digital currency platform", after receiving a remote digital instruction, the target digital currency wallet terminal determines whether the wallet serial number of a counterparty belongs to the updated risk wallet serial number list. If yes, namely, if the digital currency wallet of the counterparty belongs to a risky digital currency wallet, the transaction will be temporarily stopped. If no, that is, if the digital currency wallet of the counterparty does not belong to a risky digital currency wallet, the transaction may continue. Through the above settings, different remote control instructions can be generated according to actual situations and the remote control triggering conditions that are satisfied, so that a digital currency wallet terminal of a user may be remotely controlled in a case of poor mobile cellular communication signals, especially, in offline situations, which ensures the security of assets of the digital currency wallet of the user.

As at least one alternative embodiment, according to the embodiments of the present disclosure, the above sending module 802 is further configured to:

send the remote control instruction to the Beidou satellite system in a broadcast, multicast, or unicast manner.

Through the above settings, different sending manners may be flexibly selected according to the number of target digital currency wallet terminals corresponding to transmitted remote control instructions, regions where the target digital currency wallet terminals belong, and types of the transmitted remote control instructions, thereby improving the sending efficiency of the remote control instruction.

Figure 9:
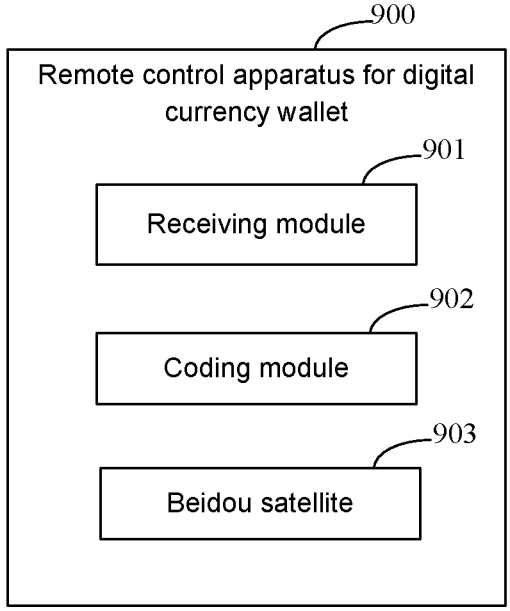
FIG. 9 is a schematic diagram of main modules of another remote control apparatus for a digital currency wallet according to the embodiments of the present disclosure.

FIG. 9 is a schematic diagram of main modules of a remote control apparatus for a digital currency wallet according to the embodiments of the present disclosure. As shown in FIG. 9, the remote control apparatus 900 for the digital currency wallet according to the embodiments of the present disclosure is arranged at a Beidou satellite system, and mainly includes:

a receiving module 901, configured to receive a remote control instruction sent by a digital currency platform, wherein the remote control instruction indicates a wallet serial number and operation manner corresponding to a target digital currency wallet terminal.

As at least one alternative embodiment, according to the embodiments of the present disclosure, since the digital currency platform often needs to send a large batch of remote control instructions (for example, for the updated risky wallet serial number list, remote control instructions often need to be sent to a plurality of digital currency wallet terminals in a region (this is mainly for digital currency wallet terminals that have poor signals or in offline states in the region)), the Beidou gateway may be used to send the remote control instructions to the appropriate Beidou module, and then the Beidou satellite system forwards the remote control instructions to the plurality of digital currency wallet terminals respectively.

a coding module 902, configured to: code the remote control instruction according to a Beidou message protocol to obtain a target message, and send the target message to a Beidou satellite.

Through the above settings, the remote control instruction is coded into the message according to the Beidou message protocol, so that the remote control instruction may be forwarded offline using the unique short message communication capability of the Beidou satellite system. In addition, due to the problems that the existing mobile cellular communications have a limited coverage range and are easily interfered in emergencies, when a communication signal of the mobile cellular communication is relatively weak, the remote control instruction may also be forwarded using the communication capability of the Beidou satellite system.

As at least one alternative embodiment, according to the embodiments of the present disclosure, the remote control apparatus 900 for the digital currency wallet described above further includes a splitting module. After the step of coding the remote control instruction according to a Beidou message protocol to obtain a target message, the splitting module is configured to:

code the remote control instruction according to the Beidou message protocol to obtain a message; and split the message according to a message transmission capability corresponding to the Beidou satellite system to obtain the target message.

According to the embodiments of the present disclosure, there is a certain difference in the single communication capability (namely, the load of the single transmitted message and a corresponding time interval) of the Beidou satellite system according to different radiation ranges of transmitted/sent information. If the length of the message determined after the remote control instruction is coded exceeds the single message transmission capability of the Beidou satellite system, the message may be split to obtain the plurality of short messages (namely, the target messages).

the Beidou satellite 903, configured to: forward the target message to the target digital currency wallet terminal according to the wallet serial number, so that: the target digital currency wallet terminal decodes the target message to obtain the remote control instruction, and achieves offline remote control according to the operation manner indicated in the remote control instruction.

As at least one alternative embodiment, according to the embodiments of the present disclosure, the remote control instruction further indicates a Beidou communication module serial number corresponding to the target digital currency wallet terminal; and the above Beidou satellite 903 is further configured to:

forward the target message to the target digital currency wallet terminal according to the Beidou communication module serial number and the wallet serial number, wherein there is one or more corresponding target digital currency wallet terminals.

As at least one alternative embodiment, according to the embodiments of the present disclosure, the remote control instruction is sent in the form of a message to the Beidou communication module of the target digital currency wallet according to the Beidou communication module serial number and the wallet serial number, so that the Beidou communication module may decode the remote control instruction in the form of a message, and then the target digital currency wallet may achieve the remote control in the offline state or in a case of weak signals after performing decryption, signature verification, and the like on the corresponding decoded remote control instruction.

Through the above settings, even if the digital currency wallet terminal is in an offline state, or in a case that a current mobile cellular communication has a poor communication signal (in this case, signals are easily interfered), the digital currency wallet terminal can still be remotely controlled, and the remote control effect can be ensured.

Figure 10:
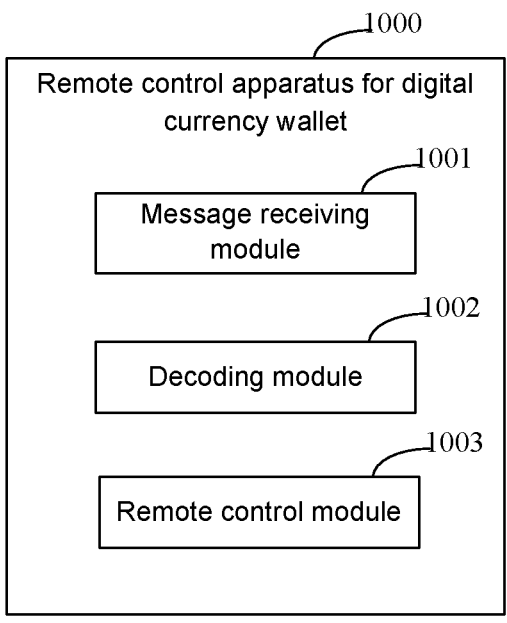
FIG. 10 is a schematic diagram of main modules of still another remote control apparatus for a digital currency wallet according to the embodiments of the present disclosure.

FIG. 10 is a schematic diagram of main modules of a remote control apparatus for a digital currency wallet according to the embodiments of the present disclosure. As shown in FIG. 10, the remote control apparatus 1000 for the digital currency wallet according to the embodiments of the present disclosure is arranged at a digital currency wallet terminal, and mainly includes:

a message receiving module 1001, configured to receive a target message forwarded by a Beidou satellite system.

As at least one alternative embodiment, according to the embodiments of the present disclosure, for the target message forwarded by the Beidou satellite system, a Beidou communication module (corresponding to a Beidou communication module serial number indicated in the remote control instruction and corresponding to the target digital currency wallet terminal) set at a target digital currency wallet terminal is used to receive the target message, so that the Beidou communication module may later decode the target message to obtain the remote control instruction.

a decoding module 1002, configured to decode the target message to obtain a remote control instruction, wherein the remote control instruction indicates an operation manner corresponding to a target digital currency wallet terminal.

As at least one alternative embodiment, according to the embodiments of the present disclosure, if the target message includes a plurality of short messages, the above decoding module 1002 is further configured to:

combine some remote control instructions obtained after the plurality of short messages are combined to obtain a remote control instruction.

Further, according to the embodiments of the present disclosure, the remote control apparatus 1000 for the digital currency wallet described above further includes a decryption processing module. If the remote control instruction obtained after decoding is encrypted and signed via a digital currency platform, the decryption processing module is configured to:

decrypt the remote control instruction; and
verify a signature corresponding to the decrypted remote control instruction.

According to the embodiments of the present disclosure, the encrypted remote control instruction may be decrypted according to a preset secret key (This is exemplary only, and any other existing encryption manners can also be used). Meanwhile, the digital currency wallet terminal that has received the remote control instruction ensures the validity and credibility of the remote control instruction by means of signature verification, which further ensures the remote control effect.

a remote control module 1003, configured to perform a corresponding operation according to the operation manner to achieve offline remote control.

As at least one alternative embodiment, according to the embodiments of the present disclosure, the above remote control instruction includes a transaction restriction instruction, so that the target digital currency wallet terminal that has received the transaction restriction instruction stops an offline transaction. That is, when the remote control triggering condition that is satisfied includes "The risk level corresponding to the digital currency platform and/or the risk level corresponding to any digital currency wallet terminal exceeds the risk level threshold", the target digital currency wallet terminal locks the wallet terminal after receiving the transaction restriction instruction and may temporarily stop the transaction.

As at least one alternative embodiment, according to the embodiments of the present disclosure, the remote control instruction may further include an updated risk wallet serial number list. When the remote control triggering condition that is satisfied includes "The risk wallet serial number list stored in any digital currency wallet terminal is inconsistent with the risk wallet serial number list stored in the digital currency platform", after receiving a remote digital instruction, the target digital currency wallet terminal determines whether the wallet serial number of a counterparty belongs to the updated risk wallet serial number list. If yes, namely, if the digital currency wallet of the counterparty belongs to a risky digital currency wallet, the transaction will be temporarily stopped. If no, that is, if the digital currency wallet of the counterparty does not belong to a risky digital currency wallet, the transaction may continue. Through the above settings, a digital currency wallet terminal of a user can be remotely controlled in a case of poor mobile cellular communication signals, especially, in offline situations, which ensures the security of assets of the digital currency wallet of the user.

Figure 11:
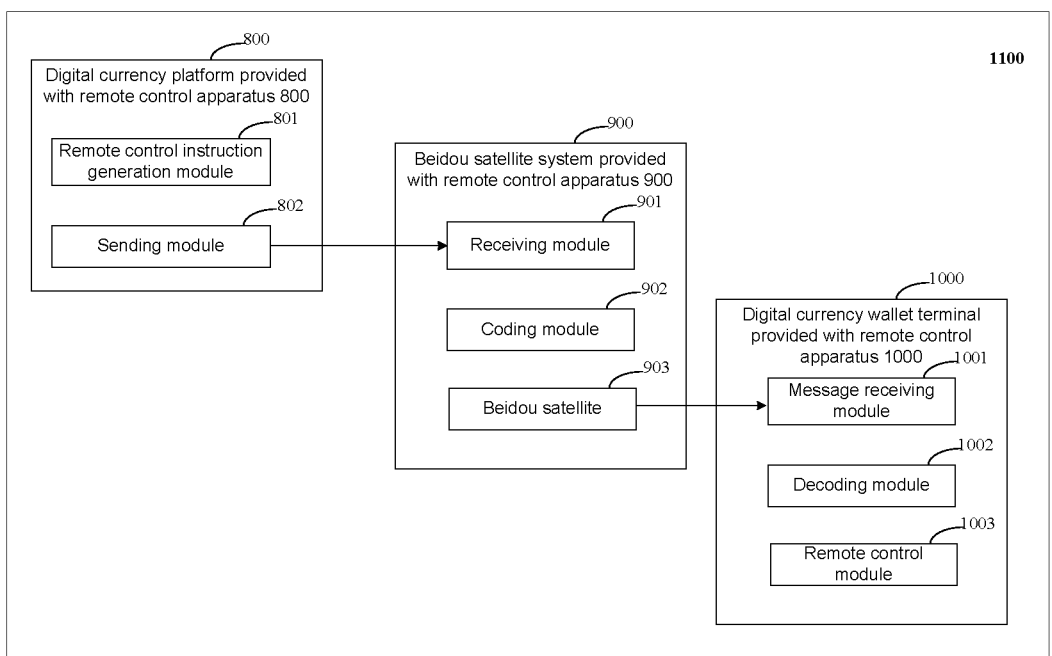
FIG. 11 is a schematic diagram of main modules of a remote control system for a digital currency wallet according to the embodiments of the present disclosure.

FIG. 11 is a schematic diagram of main modules of a remote control system for a digital currency wallet according to the embodiments of the present disclosure. As shown in FIG. 11, the remote control system 1100 for the digital currency wallet according to the embodiments of the present disclosure mainly includes:

a digital currency platform provided with a remote control apparatus 800, configured to: set a remote control triggering condition according to a service security requirement; in a case that the remote control triggering condition is satisfied, generate a remote control instruction; and send the remote control instruction to the Beidou satellite system, wherein the remote control instruction indicates a wallet serial number and operation manner corresponding to a target digital currency wallet terminal.

As at least one alternative embodiment, according to the embodiments of the present disclosure, the above wallet serial number corresponding to the target digital currency wallet terminal is determined according to the remote control triggering condition that is satisfied; and the remote control triggering condition includes one or more of the following:

a risk level corresponding to the digital currency platform and/or a risk level corresponding to any digital currency wallet terminal exceeds a risk level threshold; and a risk wallet serial number list stored in any digital currency wallet terminal is inconsistent with a risk wallet serial number list stored in the digital currency platform.

According to the embodiments of the present disclosure, the risk level threshold is set according to an actual situation, and a risk corresponding to the digital currency platform or the digital currency wallet terminal mainly refers to, for example, a network attack.

Through the above settings, the remote control instruction may be generated if the remote control triggering condition is satisfied. The remote control instruction is then sent in the form of a message to a corresponding digital currency wallet terminal (namely, the target digital currency wallet terminal) by means of a Beidou satellite system, so that even if the digital currency wallet terminal is in an offline state, or in a case that a current mobile cellular communication has a poor communication signal (in this case, signals are easily interfered), the digital currency wallet terminal can still be remotely controlled, and the remote control effect can be ensured.

Exemplarily, according to the embodiments of the present disclosure, after the step of generating a remote control instruction, the above digital currency platform is further configured to:

encrypt the remote control instruction; and sign the encrypted remote control instruction.

According to the embodiments of the present disclosure, the generated remote control instruction may be encrypted according to a preset secret key (This is exemplary only, and any other existing encryption manners can also be used) to avoid tampering with the remote control instruction, or the like. Meanwhile, whether to sign the remote control instruction may be determined according to an actual situation. It is easily understood that signing the remote control instruction helps the digital currency wallet terminal that later receives the remote control instruction to ensure the validity and credibility of the remote control instruction by means of signature verification, which further ensures the remote control effect.

a Beidou satellite system provided with a remote control apparatus 900, configured to: receive the remote control instruction sent by the digital currency platform, code the remote control instruction according to a Beidou message protocol to obtain a target message, and forward, according to the wallet serial number, the target message to the target digital currency wallet terminal that is in an offline state.

As at least one alternative embodiment, according to the embodiments of the present disclosure, after the step of coding the remote control instruction according to a Beidou message protocol to obtain a target message, the Beidou satellite system is further configured to:

code the remote control instruction according to the Beidou message protocol to obtain a message; and split the message according to a message transmission capability corresponding to the Beidou satellite system to obtain the target message.

As at least one alternative embodiment, according to the embodiments of the present disclosure, the remote control instruction further indicates a Beidou communication module serial number corresponding to the target digital currency wallet terminal; and the above Beidou satellite system is further configured to:

forward the target message to the target digital currency wallet terminal according to the Beidou communication module serial number and the wallet serial number, wherein there is one or more corresponding target digital currency wallet terminals.

As at least one alternative embodiment, according to the embodiments of the present disclosure, the remote control instruction is sent in the form of a message to the Beidou communication module of the target digital currency wallet according to the Beidou communication module serial number and the wallet serial number, so that the Beidou communication module can decode the remote control instruction in the form of a message, and then the target digital currency wallet may achieve the remote control in the offline state or in a case of weak signals after performing decryption, signature verification, and the like on the corresponding decoded remote control instruction.

Through the above settings, even if the digital currency wallet terminal is in an offline state, or in a case that a current mobile cellular communication has a poor communication signal (in this case, signals are easily interfered), the digital currency wallet terminal can still be remotely controlled, and the remote control effect can be ensured.

a digital currency wallet terminal provided with a remote control apparatus 1000, configured to: receive the target message forwarded by the Beidou satellite system, decode the target message to obtain the remote control instruction, and perform a corresponding operation according to the operation manner indicated by the remote control instruction to achieve offline remote control.

As at least one alternative embodiment, according to the embodiments of the present disclosure, if the target message includes a plurality of short messages, the above digital currency wallet terminal is further configured to:

combine some remote control instructions obtained after the plurality of short messages are decoded to obtain a remote control instruction.

As at least one alternative embodiment, according to the embodiments of the present disclosure, if the remote control instruction obtained after decoding is encrypted and signed via a digital currency platform, the above digital currency wallet terminal is further configured to:

decrypt the remote control instruction; and verify a signature corresponding to the decrypted remote control instruction.

According to the embodiments of the present disclosure, the encrypted remote control instruction may be decrypted according to a preset secret key (This is exemplary only, and any other existing encryption manners can also be used). Meanwhile, the digital currency wallet terminal that has received the remote control instruction ensures the validity and credibility of the remote control instruction by means of signature verification, which further ensures the remote control effect.

Figure 12:
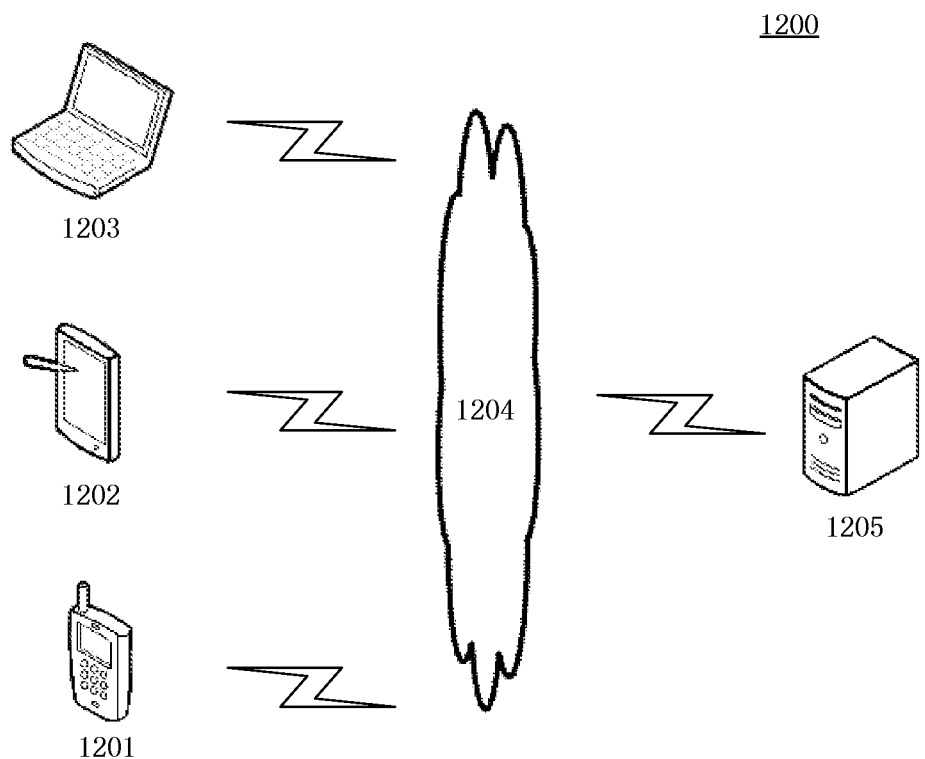
FIG. 12 is a diagram of an exemplary system architecture where the embodiments of the present disclosure can be applied.

FIG. 12 shows an exemplary system architecture 1200 where the digital currency wallet management method, the remote control methods for the digital currency wallet, the digital currency wallet management apparatus, and the remote control apparatuses for the digital currency wallet according to the embodiments of the present disclosure can be applied.

As shown in FIG. 12, the system architecture 1200 can include terminal devices 1201, 1202, 1203, a network 1204, and an electronic device 1205. The network 1204 is a medium configured to provide communication links between the terminal devices 1201, 1202, 1203 and the electronic device 1205. The network 1204 may include various connection types, such as wired and wireless communication links or optical cables.

A user may use the terminal devices 1201, 1202, 1203 to interact with the electronic device 1205 through the network 1204 to receive or send messages. Various communication client applications may be installed on the terminal devices 1201, 1202, and 1203, such as a shopping application, a web browser application, a search application, an instant messaging tool, an email client, and social platform software.

The terminal devices 1201, 1202, and 1203 can be various electronic devices that have display screens and support web browsing, including but not limited to smart phones, tablets, laptops, desk computers, and the like.

The electronic device 1205 can be a server that provides various services, for example, a background management server that supports shopping websites browsed by users using the terminal devices 1201, 1202, and 1203. The background management server can analyze received data such as a product information query request, and feed back a processing result (such as target pushing information and product information) to the terminal devices.

It should be understood that the quantities of the terminal devices, the networks, and the electronic devices in FIG. 12 are only indicative. According to an implementation need, there can be any quantity of terminal devices, networks, and electronic devices.

Figure 13:
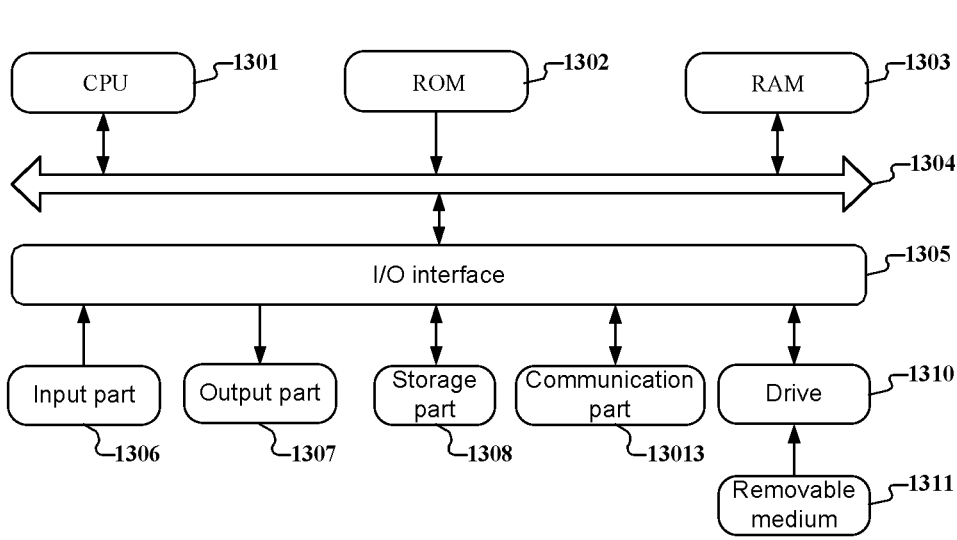
FIG. 13 is a schematic structural diagram of a computer system suitable of a terminal device or a server for being configured to implement the embodiments of the present disclosure.

Reference is now made to FIG. 13 below, which shows a schematic structural diagram of a computer system 1300 of a terminal device for being configured to implement the embodiments of the present disclosure. The terminal device shown in FIG. 13 is only an example and should not impose any limitations on the functions and scope of use of the embodiments of the present disclosure.

As shown in FIG. 13, the computer system 1300 includes a central processing unit (CPU) 1301 that can perform various appropriate actions and processing according to programs stored in a Read-Only Memory (ROM) 1302 or loaded from a storage part 1308 to a Random Access Memory (RAM) 1303. Various programs and data required for operations of the system 1300 may also be stored in the RAM 1303. The CPU 1301, the ROM 1302, and the RAM 1303 are connected to each other through a bus 1304. An Input/Output (I/O) interface 1305 is also connected to a bus 1304.

The following components are connected to the I/O interface 1305: an input part 1306, including a keyboard, a mouse, and the like; an output part 1307 such as a cathode ray tube (CRT), a liquid crystal display (LCD), and a speaker; a storage part 1308, including a hard disk drive; and a communication part 1309, including a network interface card such as a local area network (LAN) card and a modem. The communication part 1309 performs communication processing through a network such as the Internet. A drive 1310 is also connected to the I/O interface 1305 as required. A removable medium 1311, such as a magnetic disk, an optical disk, a magneto-optical disk, and a semiconductor memory, is installed on the drive 1310 as required, so that a computer program read from the removable medium is installed into the storage part 1308 as required.

Particularly, according to the embodiments disclosed in the present disclosure, the process described in the reference flowchart above can be implemented as a computer software program. For example, the embodiments disclosed in the present disclosure include a computer program product, including a computer program carried on a computer-readable medium, and the computer program includes program codes used for performing the methods shown in the flowcharts. In such an embodiment, the computer program may be downloaded and installed from a network through the communication part 1309, or installed from the removable medium 1311. When the computer program is executed by the CPU 1301, the above-mentioned functions defined in the systems of the present disclosure are executed.

It should be noted that the computer-readable medium mentioned in the present disclosure can be a computer-readable signal medium, a computer-readable storage medium, or any combination of the computer-readable signal medium and the computer-readable storage medium. The computer-readable storage medium can be, for example, but not limited to, electric, magnetic, optical, electromagnetic, infrared, or semiconductor systems, apparatuses, or devices, or any combination of the above. More specific examples of the computer-readable storage medium may include, but are not limited to: an electrical connection with one or more wires, a portable computer disk, a hard disk drive, a RAM, a ROM, an Erasable Programmable Read Only Memory (EPROM) or flash memory, an optical fiber, a Compact Disc Read-Only Memory (CD-ROM), an optical storage device, a magnetic storage device, or any suitable combination of the above. In the present disclosure, the computer-readable storage medium may be any tangible medium that contains or stores a program, and the program can be used by or in combination with an instruction execution system, apparatus, or device. In the present disclosure, the computer-readable signal media may include data signals propagated in a baseband or as part of a carrier wave, which carries computer-readable program codes. The propagated data signals can be in various forms, including but not limited to: electromagnetic signals, optical signals, or any suitable combination of the above. The computer-readable signal medium may also be any computer-readable medium other than a computer-readable storage medium. The computer-readable medium can send, propagate, or transmit programs for use by or in combination with an instruction execution system, apparatus, or device. The program codes contained in the computer-readable medium can be transmitted using any suitable medium, including but are not limited to: a wire, an optical cable, a Radio Frequency (RF), and the like, or any suitable combination of the above.

The flowcharts and block diagrams in the accompanying drawings illustrate possible system architectures, functions, and operations that may be implemented by a system, a method, and a computer program product according to various embodiments of the present disclosure. In this regard, each block in a flowchart or a block diagram may represent a module, a program, or a part of a code. The module, the program, or the part of the code includes one or more executable instructions used for implementing specified logic functions. In some implementations used as substitutes, functions annotated in blocks may alternatively occur in a sequence different from that annotated in an accompanying drawing. For example, actually two blocks shown in succession may be performed basically in parallel, and sometimes the two blocks may be performed in a reverse sequence. This is determined by a related function. It is also be noted that each box in a block diagram or a flowchart and a combination of boxes in the block diagram or the flowchart may be implemented by using a dedicated hardware-based system configured to perform a specified function or operation, or may be implemented by using a combination of dedicated hardware and a computer instruction.

The modules described in the embodiments of the present disclosure can be implemented through software or hardware. The described modules can also be arranged in the processor. For example, this can be described as: A processor includes a digital currency wallet, a satellite timing module, an offline determining module, and a transceiver module. The names of these modules do not impose limitations on the modules in certain circumstances. For example, the satellite timing module can also be described as "being configured to obtain a current moment by means of a communication satellite in a case that a connection state with a digital currency platform indicates an offline state".

As another aspect, the present disclosure further provides a computer-readable medium. The computer-readable medium may be included in the device described in the above embodiment or exist alone and is not assembled into the device. The above computer-readable medium carries one or more programs. When the above one or more programs are executed by the device, the device is caused to: detect a connection state with a digital currency platform; obtain a current moment by means of a communication satellite in a case that the connection state with the digital currency platform indicates an offline state; calculate an offline duration according to the current moment and a self-saved last synchronization moment; determine whether the offline duration is greater than a preset offline duration; and in a case that it is determined that the offline duration is greater than the preset offline duration, generate a wallet key information set, and send the wallet key information set to the digital currency platform, so that the digital currency platform synchronizes and processes the wallet key information set.

As another aspect, the present disclosure further provides a computer-readable medium. The computer-readable medium may be included in the device described in the above embodiment or exist alone and is not assembled into the device. The above computer-readable medium carries one or more programs. When the above one or more programs are executed by the device, the device is caused to: receive a target message forwarded by a Beidou satellite system, decode the target message to obtain a remote control instruction, wherein the remote control instruction indicates an operation manner corresponding to a target digital currency wallet terminal, and perform a corresponding operation according to the operation manner to achieve offline remote control.

The above specific implementations do not impose a limitation on the protection scope of the present disclosure. Those skilled in the art should understand that various modifications, combinations, sub-combinations, and substitutions can be made depending on the design requirements and other factors. Any modification, equivalent replacement, and improvement made within the spirit and principle of the present disclosure shall fall within the protection scope of the present disclosure.

What is claimed is:

1. A digital currency wallet management method, applied to a target digital currency wallet terminal, and comprising:

detecting a connection state with a digital currency platform;

obtaining a current moment by means of a communication satellite in a case that the connection state with the digital currency platform indicates an offline state;

calculating an offline duration according to the current moment and a self-saved last synchronization moment;

determining whether the offline duration is greater than a preset offline duration;

in a case that the offline duration is greater than the preset offline duration, determining a service security requirement and sending a remote control instruction with wallet information to a Beidou satellite system, so that the Beidou satellite system forwards, according to a wallet serial number, remote control instruction to the target digital currency wallet terminal that is in an offline state to achieve offline remote control of the target digital currency wallet terminal.

2. The method as claimed in claim 1, wherein the obtaining a current moment by means of a communication satellite in a case that the connection state with the digital currency platform indicates an offline state comprises:

sending a latest moment acquiring request to a Beidou satellite;

receiving a first latest moment returned by the Beidou satellite; and taking the first latest moment as the current moment.

3. The method as claimed in claim 1, wherein in a case that the offline duration is greater than the preset offline duration, the method further comprises:

locking the target digital currency wallet, and executing, according to self-saved wallet key information, a step of generating a wallet key information set, and sending the wallet key information set to the digital currency platform, so that the digital currency platform synchronizes and processes the wallet key information set.

4. The method as claimed in claim 3, wherein the wallet key information comprises any one or more pieces of the following information:

time information, positioning information, an offline duration, digital currency information, and transaction information;

the generating a wallet key information set comprises:

encrypting the wallet key information to obtain encrypted wallet key information; and signing the encrypted wallet key information to obtain a signature identifier, and taking the encrypted wallet key information and the signature identifier as the wallet key information set.

5. The method as claimed in claim 3, wherein the sending the wallet key information set to the digital currency platform comprises:

uploading the wallet key information set to the Beidou satellite, so that the Beidou satellite sends the wallet key information set to the digital currency platform, and the digital currency platform synchronizes and processes the wallet key information set.

6. The method as claimed in claim 5, wherein the uploading the wallet key information set to the Beidou satellite comprises:

writing the wallet key information set into a message to be sent;

determining whether a length of the message is greater than a length corresponding to a message communication capability of the message;

in a case that it is determined that the length of the message is greater than the length corresponding to the message communication capability of the message, splitting the message according to the message communication capability; and sending the split message to the Beidou satellite.

7. The method as claimed in claim 3, wherein after sending the wallet key information set to the digital currency platform, the method further comprises:

monitoring whether synchronization success information returned by the digital currency platform has been received; and in a case that the synchronization success information has not been received within a preset duration, resending the wallet key information set to the digital currency platform, and returning to execute the step of monitoring whether synchronization success information returned by the digital currency platform has been received.

8. The method as claimed in claim 1, wherein the detecting a connection state with a digital currency platform comprises at least one of following:

digital currency platform; and detecting a connection result of the connection request, and determining the connection state with the digital currency platform according to the connection result;

regularly sending a heartbeat signal to the digital currency platform to detect the connection state with the digital currency platform; and sending the connection request to the digital currency platform according to a received transaction request, so as to detect the connection state with the digital currency platform.

9. The method as claimed in claim 8, wherein the sending the connection request to the digital currency platform according to a received transaction request, so as to detect the connection state with the digital currency platform comprises:

sending the connection request to the digital currency platform for at least once every time one transaction request has been received, so as to detect the connection state with the digital currency platform; or progressively increasing the number of the received transaction requests, and when the number is greater than a preset number threshold, sending the connection request to the digital currency platform for at least once, so as to detect the connection state with the digital currency platform.

10. A remote control method for a digital currency wallet, applied to a digital currency platform, and comprising:

in a case that an offline duration of a target digital currency wallet terminal is greater than a preset offline duration, determining a service security requirement, and setting a remote control triggering condition according to the service security requirement, and in a case that the remote control triggering condition is satisfied, generating a remote control instruction with wallet information, wherein the remote control instruction indicates a wallet serial number and operation manner corresponding to the target digital currency wallet terminal; and sending the remote control instruction to a Beidou satellite system, so that: the Beidou satellite system forwards, according to the wallet serial number, the remote control instruction in the form of a message to the target digital currency wallet terminal that is in an offline state to achieve offline remote control of the target digital currency wallet terminal.

11. The remote control method for the digital currency wallet as claimed in claim 10, wherein the wallet serial number corresponding to the target digital currency wallet terminal is determined according to the remote control triggering condition that is satisfied; and the remote control triggering condition comprises one or more of the following:

a risk level corresponding to the digital currency platform and/or a risk level corresponding to any digital currency wallet terminal exceeds a risk level threshold; and a risk wallet serial number list stored in any digital currency wallet terminal is inconsistent with a risk wallet serial number list stored in the digital currency platform.

12. The remote control method for the digital currency wallet as claimed in claim 11, wherein the remote control instruction comprises a transaction restriction instruction, so that the target digital currency wallet terminal that has received the transaction restriction instruction stops an offline transaction; or after the step of generating a remote control instruction, the remote control method further comprises: encrypting the remote control instruction; and signing the encrypted remote control instruction.

13. A remote control method for a digital currency wallet, applied to a Beidou satellite system, and comprising:

in a case that an offline duration of a target digital currency wallet terminal is greater than a preset offline duration, receiving a remote control instruction with wallet information sent by a digital currency platform, wherein the remote control instruction is determined by a service security requirement, the remote control instruction indicates a wallet serial number and operation manner corresponding to the target digital currency wallet terminal; and coding the remote control instruction according to a Beidou message protocol to obtain a target message; and forwarding the target message to the target digital currency wallet terminal according to the wallet serial number, so that: the target digital currency wallet terminal decodes the target message to obtain the remote control instruction, and achieves offline remote control according to the operation manner indicated in the remote control instruction.

14. The remote control method for the digital currency wallet as claimed in claim 13, wherein the remote control instruction further indicates a Beidou communication module serial number corresponding to the target digital currency wallet terminal; and the forwarding the target message to the target digital currency wallet terminal according to the wallet serial number comprises:

forwarding the target message to the target digital currency wallet terminal according to the Beidou communication module serial number and the wallet serial number, wherein there is one or more corresponding target digital currency wallet terminals.

15. The remote control method for the digital currency wallet as claimed in claim 13, wherein after the step of coding the remote control instruction according to a Beidou message protocol to obtain a target message, the remote control method further comprises:

coding the remote control instruction according to the Beidou message protocol to obtain a message; and splitting the message according to a message transmission capability corresponding to the Beidou satellite system to obtain the target message.

16. A remote control method for a digital currency wallet, applied to a target digital currency wallet terminal, and comprising:

in a case that an offline duration of a target digital currency wallet terminal is greater than a preset offline duration, receiving a target message forwarded by a Beidou satellite system;

decoding the target message to obtain a remote control instruction with wallet information, wherein the remote control instruction is determined by a service security requirement, the remote control instruction indicates an operation manner corresponding to a target digital currency wallet terminal; and performing a corresponding operation according to the operation manner to achieve offline remote control.

17. A digital currency wallet management system, comprising a digital currency management platform, a communication satellite, and the digital currency wallet management apparatus, wherein the digital currency management platform is configured to: receive wallet key information set sent by the digital currency wallet management apparatus, and synchronize and process the wallet key information set;

the communication satellite is configured to: receive a current moment acquiring request sent by the digital currency wallet management apparatus, and return a current moment to the digital currency wallet management apparatus in response to the current moment acquiring request; and the digital currency wallet management apparatus is configured to: in a case that an offline duration of a target digital currency wallet terminal is greater than a preset offline duration, receive a target message forwarded by a Beidou satellite system, decode the target message to obtain a remote control instruction with wallet information, wherein the remote control instruction is determined by a service security requirement, the remote control instruction indicates an operation manner corresponding to a target digital currency wallet terminal; and perform a corresponding operation according to the operation manner to achieve offline remote control.

18. A remote control system for a digital currency wallet, comprising a digital currency platform, a Beidou satellite system, and at least one digital currency wallet terminal, wherein the digital currency platform is configured to: in a case that an offline duration of a target digital currency wallet terminal is greater than a preset offline duration, determine a service security requirement, and set a remote control triggering condition according to the service security requirement; in a case that the remote control triggering condition is satisfied, generate a remote control instruction with wallet information; and send the remote control instruction to the Beidou satellite system, wherein the remote control instruction indicates a wallet serial number and operation manner corresponding to a target digital currency wallet terminal;

the Beidou satellite system is configured to: receive the remote control instruction sent by the digital currency platform, code the remote control instruction according to a Beidou message protocol to obtain a target message, and forward, according to the wallet serial number, the target message to the target digital currency wallet terminal that is in an offline state; and the digital currency wallet terminal is configured to: receive the target message forwarded by the Beidou satellite system, decode the target message to obtain the remote control instruction, and perform a corresponding operation according to the operation manner indicated by the remote control instruction to achieve offline remote control.

19. An electronic device, comprising:

one or more processors;

a memory apparatus, configured to store one or more programs, wherein the one or more programs, when executed by the one or more processors, cause the one or more processors to implement following actions:

detecting a connection state with a digital currency platform;

obtaining a current moment by means of a communication satellite in a case that the connection state with the digital currency platform indicates an offline state;

calculating an offline duration according to the current moment and a self-saved last synchronization moment;

determining whether the offline duration is greater than a preset offline duration;

in a case that the offline duration is greater than the preset offline duration, determining a service security requirement and sending a remote control instruction with wallet information to a Beidou satellite system, so that the Beidou satellite system forwards, according to a wallet serial number, remote control instruction to the target digital currency wallet terminal that is in an offline state to achieve offline remote control of the target digital currency wallet terminal.

20. A non-transitory computer-readable medium, which stores a computer program, wherein the program, when executed by a processor, implements following actions:

detecting a connection state with a digital currency platform;

obtaining a current moment by means of a communication satellite in a case that the connection state with the digital currency platform indicates an offline state;

calculating an offline duration according to the current moment and a self-saved last synchronization moment;

determining whether the offline duration is greater than a preset offline duration;

in a case that it is determined that the offline duration is greater than the preset offline duration, determining a service security requirement and sending a remote control instruction with wallet information to a Beidou satellite system, so that the Beidou satellite system forwards, according to a wallet serial number, remote control instruction to the target digital currency wallet terminal that is in an offline state to achieve offline remote control of the target digital currency wallet terminal.

* * * * *